US010413822B2

(12) United States Patent
Katagai et al.

(10) Patent No.: US 10,413,822 B2
(45) Date of Patent: Sep. 17, 2019

(54) GAME MACHINE AND GAME PROGRAM

(71) Applicant: KONAMI DIGITAL ENTERTAINMENT CO., LTD., Tokyo (JP)

(72) Inventors: Tahei Katagai, Tokyo (JP); Hitomi Kitamura, Tokyo (JP)

(73) Assignee: KONAMI DIGITAL ENTERTAINMENT CO., LTD., Minato-ku, Tokyo (JP)

( * ) Notice: Subject to any disclaimer, the term of this patent is extended or adjusted under 35 U.S.C. 154(b) by 8 days.

(21) Appl. No.: 15/716,867

(22) Filed: Sep. 27, 2017

(65) Prior Publication Data

US 2018/0015368 A1  Jan. 18, 2018

Related U.S. Application Data

(63) Continuation-in-part of application No. PCT/JP2016/056988, filed on Mar. 7, 2016.

(30) Foreign Application Priority Data

Mar. 31, 2015 (JP) ................................ 2015-074462

(51) Int. Cl.
*A63F 13/44* (2014.01)
*A63F 13/814* (2014.01)
(Continued)

(52) U.S. Cl.
CPC .......... *A63F 13/44* (2014.09); *A63F 13/2145* (2014.09); *A63F 13/22* (2014.09);
(Continued)

(58) Field of Classification Search
CPC ...... A63F 13/44; A63F 13/2145; A63F 13/22; A63F 13/426; A63F 13/46; A63F 13/537; A63F 13/63; A63F 13/814
(Continued)

(56) References Cited

U.S. PATENT DOCUMENTS 8,728,822 B2  5/2014 Ryu
8,986,090 B2  3/2015 Epstein
(Continued)

FOREIGN PATENT DOCUMENTS

JP         11-151380 A    6/1999
JP      2010-036038 A    2/2010
(Continued)

OTHER PUBLICATIONS

"Guitar Freaks XG 2 Groove to Live Drum Mania XG 2 Groove to Live", 'Gekkan Arcadia Apr. 2011 No. 131', Enterbrain, Inc., 2011, vol. 12, No. 4, pp. 054-055 (5 pages).
(Continued)

*Primary Examiner* — Allen Chan
(74) *Attorney, Agent, or Firm* — Sughrue Mion, PLLC

(57) ABSTRACT

A game machine includes a first operation acceptor, a register, a second operation acceptor, an output controller, and an evaluator. The first operation acceptor is configured to accept a first operation in an editing mode. The register is configured to register a display position of a reference indicator over a display screen. The second operation acceptor is configured to accept a second operation in a play mode different from the editing mode. The output controller is configured to display the reference indicator at the display position, registered by the register, over the display screen, and to move a movement object toward the reference indicator at the display position over the display screen. The evaluator is configured to evaluate the second operation based at least in part on a first timing that the movement object reaches the reference indicator and a second timing that the second operation is performed.

14 Claims, 16 Drawing Sheets

(51) Int. Cl.
    *A63F 13/63*     (2014.01)
    *A63F 13/2145*   (2014.01)
    *A63F 13/22*     (2014.01)
    *A63F 13/426*    (2014.01)
    *A63F 13/46*     (2014.01)
    *A63F 13/537*    (2014.01)

(52) U.S. Cl.
    CPC ............ *A63F 13/426* (2014.09); *A63F 13/46* (2014.09); *A63F 13/537* (2014.09); *A63F 13/63* (2014.09); *A63F 13/814* (2014.09)

(58) Field of Classification Search
    USPC .......................................................... 463/31
    See application file for complete search history.

(56) References Cited

U.S. PATENT DOCUMENTS

| 2008/0113698 | A1  | 5/2008  | Egozy                      |
|--------------|-----|---------|----------------------------|
| 2009/0258700 | A1* | 10/2009 | Bright ............ A63F 13/10 463/31 |
| 2011/0009191 | A1* | 1/2011  | Naidenov ......... G10H 1/0016 463/35 |
| 2011/0034247 | A1* | 2/2011  | Masuda ............ G10H 1/342 463/35 |
| 2011/0207513 | A1  | 8/2011  | Cross et al.               |
| 2012/0225715 | A1  | 9/2012  | Yamamoto                   |
| 2014/0155157 | A1* | 6/2014  | Hazama ............ A63F 13/00 463/31 |

FOREIGN PATENT DOCUMENTS

| JP | 2011-030872 A  | 2/2011  |
| JP | 2013-081703 A  | 5/2013  |
| JP | 2014-027974 A  | 2/2014  |
| JP | 2014-61157 A   | 4/2014  |
| JP | 2015058127 A   | 3/2015  |
| WO | 2016/158213 A1 | 10/2016 |

OTHER PUBLICATIONS

"beatmania IIDX 17 SIRIUS", 'Gekkan Arcadia Dec. 2009 No. 115', Enterbrain, Inc., 2009, vol. 10, No. 12, pp. 052 to 057 (9 pages).
International Search Report dated May 24, 2016, from the International Bureau in counterpart International application No. PCT/JP2016/056956.
Written Opinion of the Internal Searching Authority dated May 24, 2016, from the International Bureau in counterpart International application No. PCT/JP2016/056956.
International Search Report dated May 17, 2016, from the International Bureau in counterpart International application No. PCT/JP2016/056988.
Written Opinion of the Internal Searching Authority dated May 17, 2016, from the International Bureau in counterpart international application No. PCT/JP2016/056988.
Communication dated Nov. 14, 2017 from the Japanese Patent Office in counterpart Application No. 2017-049010.
Communication dated Mar. 20, 2018, from the Japanese Patent Office in counterpart application No. 2017-049010.
Machine Translation of Communication dated Jun. 29, 2018 issued by the Korean Intellectual Property Office in counterpart application No. 10-2017-7027019.
Machine Translation of Communication dated Jul. 13, 2018 issued by the Korean Intellectual Property Office in counterpart application No. 10-2017-7027020.
Notice of Allowance dated Jan. 10, 2019 in Korean Application No. 10-2017-7027019.
Notice of Allowance dated Jan. 22, 2019 in Korean Application No. 10-2017-7027020.
Office Action dated Jan. 14, 2019 in U.S. Appl. No. 15/712,597.
Communication dated Jun. 5, 2019, from the United States Patent and Trademark Office in counterpart U.S. Appl. No. 15/712,597.

* cited by examiner

GAME MACHINE AND GAME PROGRAM

BACKGROUND

Technical Field

This disclosure generally relates to a game machine and a game program.

Related Art

A timing game is designed to adjust timing to a rhythm, a melody, or a movement of an image. In such a timing game, an evaluation is made based on the offset between the timing instructed in the game and the timing of an operation made by a user.

Japanese Patent Application Publication No. 2013-81703 discloses such a game machine, which enables the user playing the game to edit the instructed timing and type of operation, with a limitation on the degree of editing freedom or with poor editing freedom.

SUMMARY

In some embodiments, a game machine may include, but is not limited to, a first operation acceptor, a register, a second operation acceptor, an output controller, and an evaluator. The first operation acceptor is configured to accept a first operation in an editing mode. The register is configured to register a display position of a reference indicator over a display screen. The second operation acceptor is configured to accept a second operation in a play mode that is different from the editing mode. The output controller is configured to display the reference indicator at the display position, registered by the register, over the display screen, the output controller configured to move a movement object toward the reference indicator at the display position over the display screen. The evaluator is configured to evaluate the second operation based at least in part on a first timing that the movement object reaches the reference indicator and a second timing that the second operation is performed.

EMBODIMENTS

Figure 1:
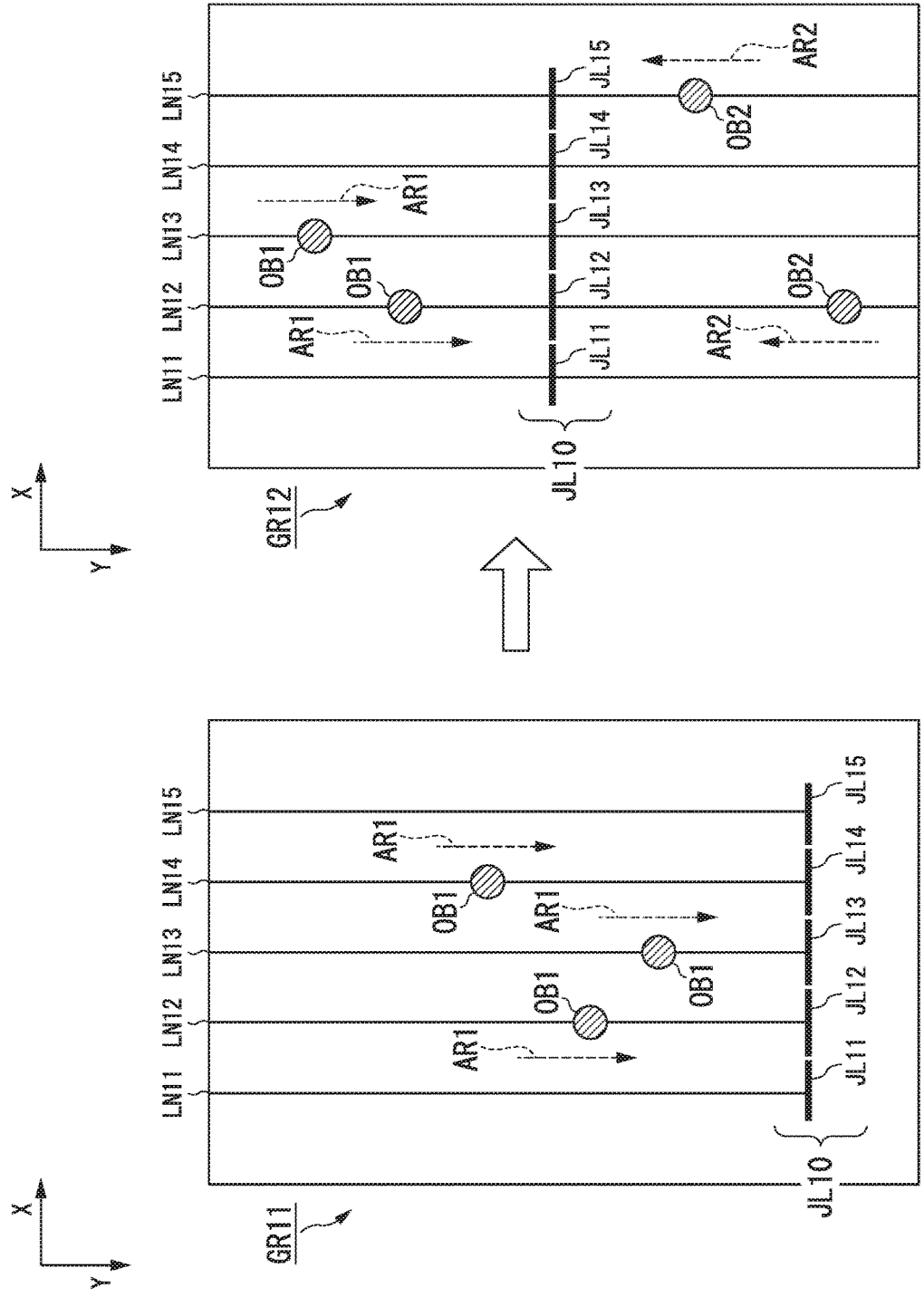
FIG. 1 shows an example of a game screen in the play mode in a game machine according to a first embodiment of the present invention.

In some embodiments, a game machine may include, but is not limited to, a first operation acceptor, a register, a second operation acceptor, an output controller, and an evaluator. The first operation acceptor is configured to accept a first operation in an editing mode. The register is configured to register a display position of a reference indicator over a display screen. The second operation acceptor is configured to accept a second operation in a play mode that is different from the editing mode. The output controller is configured to display the reference indicator at the display position, registered by the register, over the display screen, the output controller configured to move a movement object toward the reference indicator at the display position over the display screen. The evaluator is configured to evaluate the second operation based at least in part on a first timing that the movement object reaches the reference indicator and a second timing that the second operation is performed.

In other embodiments, the output controller is configured to move the reference indicator to the display position registered by the register, if the reference indicator is displayed at a different position from the display position.

In other embodiments, the register is configured to further register at least one of a third timing that the reference indicator starts to move toward the display position and a fourth timing that the reference indicator completes moving to the display position. The output controller is configured to move the reference indicator at the at least one of the third timing and the fourth timing, which was registered by the register.

In other embodiments, the register is configured to register the at least one of the third timing and the fourth timing if a time difference between the third timing and the fourth timing is greater than a predefined time period.

In other embodiments, the output controller is configured to output an alert if a time difference between the third timing and the fourth timing is shorter than a predefined time period.

In other embodiments, the register is configured to further register a display angle of the reference indicator over the display screen. The output controller is configured to display the reference indicator at the display angle which was registered by the register.

In other embodiments, the register is configured to further register a shape of the reference indicator over the display screen. The output controller is configured to display the reference indicator with the shape which was registered by the register.

In other embodiments, the output controller is configured to move the reference indicator to reach the reference indicator in a predefined direction with reference to the display screen.

In other embodiments, the register is configured to further register, based on the first operation, at least one of a display position, a display angle and a shape of each of a plurality of the reference indicator which are to be displayed simultaneously over the display screen by the output controller.

In other embodiments, a non-transitory computer readable storage medium that stores a software component which comprises computer-executable instructions, when executed by a computer, to cause the computer to at least: accept a first operation in an editing mode; register a display position of a reference indicator over a display screen; accept a second operation in a play mode that is different from the editing mode; display the reference indicator at the display position, registered by the register, over the display screen; move a movement object toward the reference indicator at the display position over the display screen; and evaluate the second operation based at least in part on a first timing that the movement object reaches the reference indicator and a second timing that the second operation is performed.

In other embodiments, the software component comprises further computer-executable instructions, when executed by a computer, to cause the computer to at least: move the reference indicator to the display position registered by the register, if the reference indicator is displayed at a different position from the display position.

In other embodiments, the software component comprises further computer-executable instructions, when executed by a computer, to cause the computer to at least: register at least one of a third timing that the reference indicator starts to move toward the display position and a fourth timing that the reference indicator completes moving to the display position, and move the reference indicator at the at least one of the third timing and the fourth timing, which was registered by the register.

In other embodiments, the software component comprises further computer-executable instructions, when executed by a computer, to cause the computer to at least: register the at least one of the third timing and the fourth timing if a time difference between the third timing and the fourth timing is greater than a predefined time period.

In other embodiments, the software component comprises further computer-executable instructions, when executed by a computer, to cause the computer to at least: output an alert if a time difference between the third timing and the fourth timing is shorter than a predefined time period.

In other embodiments, the software component comprises further computer-executable instructions, when executed by a computer, to cause the computer to at least: register a display angle of the reference indicator over the display screen, and display the reference indicator at the display angle which was registered by the register.

In other embodiments, the software component comprises further computer-executable instructions, when executed by a computer, to cause the computer to at least: register a shape of the reference indicator over the display screen, and display the reference indicator with the shape which was registered by the register.

In other embodiments, the software component comprises further computer-executable instructions, when executed by a computer, to cause the computer to at least: move the reference indicator to reach the reference indicator in a predefined direction with reference to the display screen.

In other embodiments, the software component comprises further computer-executable instructions, when executed by a computer, to cause the computer to at least:

In other embodiments, the software component comprises further computer-executable instructions, when executed by a computer, to cause the computer to at least: register, based on the first operation, at least one of a display position, a display angle and a shape of each of a plurality of the reference indicator which are to be displayed simultaneously over the display screen by the output controller.

(First Embodiment)
(Game Machine Overview)

The first embodiment of the present invention will now be described.

The game machine 10 according to the present embodiment is a terminal device that executes a video game. The game machine 10 has a display device that displays a game screen and an input device that accepts user operations related to a game. In this case, as one example, the description will be of the case in which the game machine 10 is a so-called smartphone, which has a touch panel 11 that displays a game screen.

The touch panel 11 according to the present embodiment is constituted by a display device having a flat, rectangular display region and a touch sensor that detects operations made on the display device, these being formed as one. In this case, as one example, the case will be described in which contacting (touching) of the touch panel 11 by a finger or stylus pen of the user is detected. In the following, as a convenience, the touching of the position corresponding to an object displayed on the touch panel 11 will be referred to a touching the object. Also, in the following, the user is a user of the game machine 10, and the description is for the case of a player who plays a game being executed by the game machine 10.

Next, the game executed by the game machine 10 will be described.

The game machine 10 in the present embodiment has two game modes, the play mode and the edit mode.

The play mode is the mode in which a so-called timing game is played. In the timing game according to the present embodiment, the operation timing is instructed in accordance with the advancement of a melody. In the play mode, when the user makes an operation in accordance with an instruction, the game machine 10 evaluates the skill of the operation made by the user. The game machine 10 grants a reward, such as points or items, in accordance with the operation evaluation result. Rather than a melody, the timing game may advance in accordance with a movie.

The edit mode is different from the play mode and is a mode in which the sequence data referenced in the execution of the play mode is edited. In this case, editing includes not only changing existing data, but also creating new data. Sequence data is stored in storage for each melody. In this case, a plurality of sequence data may be stored with respect to one melody. The details of sequence data will be described later.

Next, an example of the game screen is the play mode will be described.

FIG. 1 shows an example of the game screen during the play mode in the game machine 10 according to the present embodiment.

The X and Y axes shown in FIG. 1, FIG. 2, and FIG. 10 to FIG. 16 are parallel to the display area (plane) of the touch panel 11, and have their point of origin at the upper-left of the display area of the touch panel 11. The X axis is parallel to the horizontal direction in the display area of the touch panel 11 and the direction of the arrow thereof shown in the drawing is the positive direction. The Y axis is parallel to the vertical direction in the display area of the touch panel 11 and the direction of the arrow thereof shown in the drawing is the positive direction. In the following, the positive direction of the Y axis in the game screen will be called the game screen downward direction, and the negative direction of the Y axis in the game screen will be called the game screen upward direction. The positive direction of the X axis in the game screen will be called the game screen rightward direction, and the negative direction of the X axis in the game screen will be called the game screen leftward direction.

FIG. 1 shows two game screens, GR11 and GR12. In the example shown in FIG. 1, the game screen, with the elapse of time (that is, with the advancement of the melody), transitions from the game screen GR11 to the game screen GR12.

In the example shown in FIG. 1, game screens GR11 and GR12 display three types of objects, five lanes, LN11 to LN15, a plurality of movement objects OB1, and the judgment lines JL11 to JL15.

The various objects displayed by the game machine 10 will now be described.

A movement object is an object that instructs a user regarding the timing and type of an operation. In the following, the operation timing instructed by a movement object will be called an instructed timing. In the present embodiment, a movement object moves with respect to a prescribed reference position and instructs the timing at which it reaches the reference position as the operation timing. The reference position is, for example, a point, a line, or a region. In the present embodiment, a movement object instructs the type of operation by its shape or picture. That is, movement objects having different shapes or pictures instruct the input of different types of operations.

A lane is an object that guides the path of movement of a movement object. In the present embodiment, the case of the lane being a straight-line object orthogonal to a judgment line will be described as one example. In this case, a movement object moves over the lane. A lane need not be displayed on the game screen. Also, a lane may have an arbitrary shape, such as a curved line, and the movement object may move over the curved line. There may be an arbitrary number of lanes.

A judgment line is an example of a reference indicator. A reference indicator is an object that indicates a reference position. A movement object, for example, reaches a judgment line in step with the rhythm of a melody. A user inputs a touch operation on, for example, the movement object, at a prescribed position, adjusting to the timing at which the center of the movement object overlaps with the judgment line. Upon detecting the touch operation, the game machine 10 evaluates the operation, based on the time difference between the detected timing of the operation and the timing instructed by the movement object.

One judgment line may represent one reference position, or may represent a plurality of reference positions. In the following, the case in which one judgment line represents one reference position will be described as one example. The judgment line need not be displayed on the game screen, the four sides of the game screen serving as the judgment lines.

In the present embodiment, a judgment line is displayed as a straight-line object, as one example. A movement object reaches the judgment line from a direction that is orthogonal to that straight line. That is, the judgment line indicates the direction in which the movement object reaches the reference position.

Next, specific examples of various movement objects in the play mode will be described, with references made to the game screens GR11 and GR12 shown in FIG. 1.

In the game screen GR11, the judgment lines JL11 to JL15 are displayed with uniform spacing in the X-axis direction, as one judgment line JL10. In the following, the group of judgment lines JL11 to JL15 will be called the judgment line JL10. In FIG. 1, although the judgment line JL10 is separated to enable distinguishing of the judgment lines JL11 to JL15, they may be joined and displayed as a continuous line.

In the game screen GR11, the judgment line JL10 is displayed at the bottom part of the screen. The movement objects OB1 appear from the top part of the screen before the prescribed time of each instruction timing and move in the direction of the arrow AR1 (that is, in the positive Y-axis direction) along the lanes LN11 to LN15. Each of the movement objects OB1 reaches the judgment line JL10 at the respective instructed timing for each. In this manner, the movement objects OB1 arrive with respect to the judgment line JL10 from an established direction.

In contrast, in the game screen GR12, the judgment line JL10 is displayed in the center part of the screen. In this case, the game machine 10 moves movement objects not only in the direction of the arrow AR1, but also in the direction of the arrow AR2. That is, in the game screen GR12, the direction of movement of movement objects with respect to the judgment line JL10 is changed from the established directions with respect to the judgment line JL10.

In this manner, the game machine 10 changes the display position of the judgment line JL10 and the direction of movement of the movement objects based on a prescribed change condition. Because the game machine 10 changes the display position of the judgment line JL10 and the direction of the movement objects as the game advances, it can impart variety to the game. The game machine 10 can therefore heighten interest in the game.

The game machine 10 causes the movement objects to arrive at the judgment line JL10 from both sides thereof. By doing this, compared to the case of causing movement objects so that they arrive from one side, it is possible to achieve various presentations and different operational feelings. The game machine 10 can therefore heighten interest in the game.

In the following, the pre-established direction of arrival of the movement object with respect to the judgment line is called the forward direction and is indicated by the arrow AR1. The direction opposing the forward direction will be called the reverse direction and is indicated by the arrow AR2. A movement object moving in the forward direction will be called a forward-direction movement object OB1, and a movement object moving in the reverse direction will be called a reverse-direction movement object OB2.

In this case, both sides of the judgment line refers to two sides, one side and the opposing side, that surround the judgment line. Stated differently, both sides of the judgment line are two regions that are at least partially separated by the judgment line. One side of the judgment line and the opposing side may have numbers of lanes that are mutually different.

The change condition is for changing the movement direction of a movement object with respect to the judgment line. Specifically, in the example of the game screen GR12, the change condition is the positioning of the judgment line JL10 in the center part of the screen. In the following, the case will be described in which, as one example, the change condition is for reversing the movement direction of movement objects from the forward direction to the reverse direction. That is, if the change condition is satisfied, the movement objects reach the judgment line from the reverse direction and, if the change condition is not satisfied, the movement objects reach the judgment line from the forward direction. Other examples of the change condition will be described later.

Next, an example of the game screen in the edit mode will be described.

Figure 2:
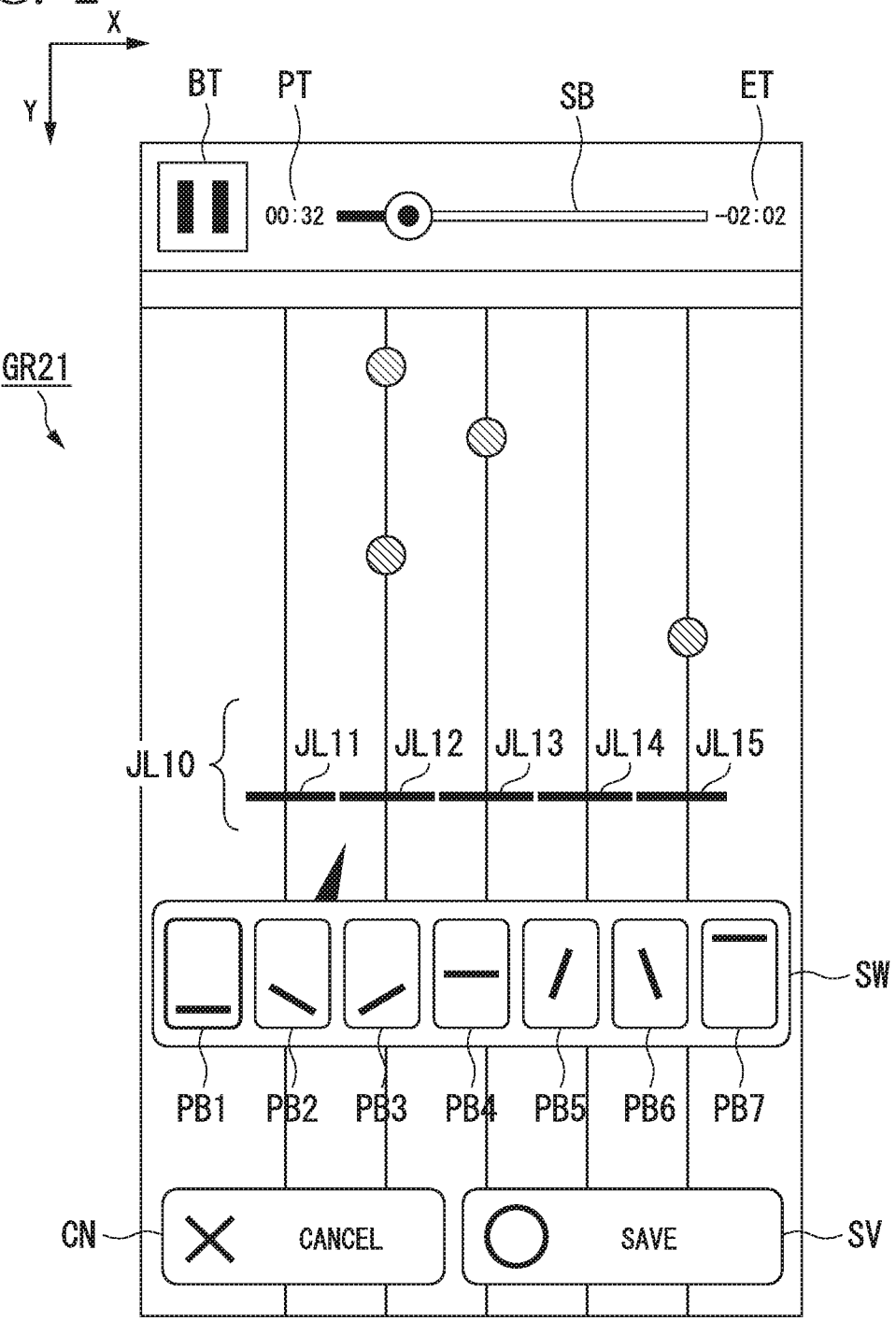
FIG. 2 shows an example of a game screen in the edit mode in the game machine according to the first embodiment of the present invention.

FIG. 2 shows an example of the game screen during the edit mode in the game machine 10 according to the present embodiment.

In the example shown in FIG. 2, the game screen GR21 provides a playback/pause button BT, a scroll bar SB, a selection window SW, a cancel button CN, and a save button SV.

The playback/pause button BT is used to advance the playback time within the melody at a prescribed speed and to stop the melody.

The scroll bar SB is used to move the playback time within the melody in response to a sliding operation.

The playback time is the time within the melody, referenced to the starting time of the melody. In the play mode, the playback time advances with the elapse of time from the start of the timing game. In the edit mode, the playback time, for example, is specified by operating the playback/pause button BT and the scroll bar SB. In the edit mode, the playback time specified by the user is displayed at the playback time PT. The length of the melody is displayed at the ending time ET.

The selection window SW presents selections regarding the pattern of the judgment line JL10.

In the game screen GR21, the selection window SW presents seven patterns, PB1 to PB7. Each pattern represents a judgment line JL10 having a different display position and display angle. Specifically, the pattern PB1 is disposed horizontally at the bottom part, that is, it represents positioning of the judgment line JL10 in the horizontal condition at the bottom part of the screen. The pattern PB2 is disposed so as to slope downward toward the right at the bottom part, that is, it represents positioning of the judgment line JL10 that is high at the left side and slopes downward toward the right side at the bottom part of the screen. The pattern PB3 is disposed so as to slope upward toward the right at the bottom part, that is, it represents positioning of the judgment line JL10 that is low at the left side and rises toward the right side at the bottom part of the screen. The pattern PB4 is disposed horizontally in the center part, that is, it represents the judgment line JL10 disposed in the horizontal condition at the center part of the screen. The pattern PB5 is disposed so as to slope upward toward the right at the center part, that is, it represents positioning of the judgment line JL10 that is low at the left side and rises toward the right side at center part of the screen. The pattern PB6 is disposed so as to slope downward toward the right at the center part, that is, it represents positioning of the judgment line JL10 that is high at the left side and slopes downward toward the right side at center part of the screen. The pattern PB7 is disposed horizontally at the top part, that is, it represents the judgment line JL10 disposed in the horizontal condition at the top part of the screen. The patterns that are presented are not restricted to the above and may, for example, be polygonal and have arbitrary positions.

The cancel button CN is for cancelling the saving of judgment line JL10 pattern selected by the user.

The save button SV is for saving a judgment line JL10 pattern selected by the user.

The user operating procedure in the edit mode will now be described.

First, in the edit mode, the user operates the playback/pause button BT and the scroll bar SB to select the time in the melody for the setting of the display position and display angle of the judgment line JL10. Next, the user selects one of the patterns PB1 to PB7 presented in the selection window SW. In response to the selection of a pattern PB1 to PB7, the playback time and identification information of the pattern are stored in memory. Next, if the selected pattern is to be saved, the user presses the save button SV, thereby storing the playback time and the pattern identification information in non-volatile storage. By doing this, when the playback time saved in the edit mode arrives in the play mode, the judgment line JL10 starts moving so as to become the pattern selected by the user. To delete a previously saved pattern, the user pressed the cancel button CN. By doing this, the playback time and the pattern identification information that had been recorded in memory are deleted from memory.

In this manner, the game machine 10 has a configuration in which the display position of the judgment line on the game screen is saved, based on user operations. By doing this, because the judgment line display position can be edited, the degree of freedom of editing the timing game can be increased. The game machine 10, therefore, can heighten the interest in the game.

(Game Machine Configuration)

Figure 3:
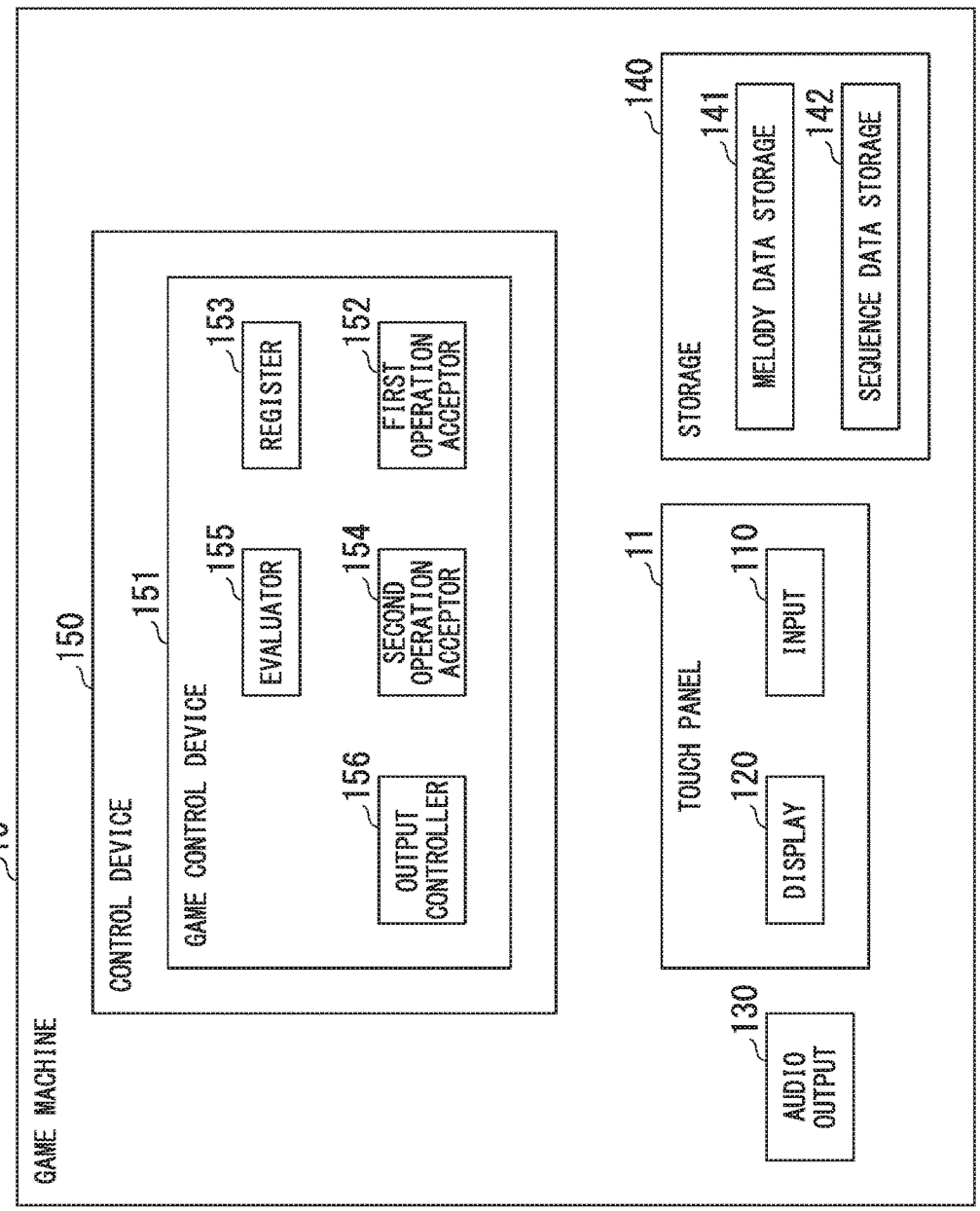
FIG. 3 is a block diagram showing the functional configuration of the game machine according to the first embodiment of the present invention.

FIG. 3 is a block diagram showing the functional configuration of the game machine 10 according to the present embodiment.

The game machine 10 has a touch panel 11 that includes an input 110 and a display 120, an audio output 130, a storage 140, and a control device 150.

The input 110 is an input device that generates an input signal in response to an operation by a user. A pointing device such as a mouse, or a keyboard, buttons, a touch pad, or a touch panel or the like can be used as the input 110. The form of the input 110 can be arbitrary and may be for example, a part or all of a stringed instrument or percussion instrument. As described above, as one example, the present embodiment is constituted by the input 110 and the display 120 formed as one in the touch panel 11. The method of the touch panel 11 detecting a touch may be, for example, a resistive film, a surface acoustic wave, an infrared, a magnetic induction, or a capacitive method. When the touch panel 11 detects a touch, it notifies the control device 150 of the timing of the touch and the touch position.

If a keyboard is used as the input 110, prescribed keys of the keyboard are allocated to prescribed operation inputs, and an input is accepted by sensing that a key has been operated. If buttons are used as the input 110, one or more buttons are provided in correspondence to operations required for the game, and an input is accepted by sensing that a button has been pressed. If a pointing device is used as the input 110, an input is accepted by appropriately moving a cursor displayed on the display 120 and clicking from the pointing device. The input 110 may have various types of pressure sensors or the like and detect the relative pressure of an input operation based on the pressure or the like detected in an operation input.

The input 110 may accept various operations. An operation, for example, may be distinguished by the number of operation accepting regions, the position of the operation acceptance regions, the operation method, or the like. In the present embodiment, such distinction is referred to as the operation type. An operation acceptance region is a region in which the input 110 accepts an operation by a user. Specifically, an operation acceptance region is a region or an operating button displayed on the game screen of the touch panel 11 that accepts an operation.

An operation method is the type of operation that can be distinguished in a given operation acceptance region. In the case of an operation made on the touch panel 11, there are operation methods such as a touch operation that detects a touch and a sliding operation, in which the touch position change is detected. A further distinction can be made of the operation method of a sliding operation in accordance with the speed of change of the touch position. A further distinction can be made of the operation method of a sliding operation in accordance with the change in the touch position by a plurality of fingers. Operation methods using two fingers include, for example, a pinch-out operation whereby the touch positions of the two fingers are moved away from each other and a pinch-in operation whereby the touch positions of the two fingers are brought closer to each other. The operation method can also be further distinguished by the number of operations, the interval between operations, the duration time of operations, and the strength of operations.

The display 120 is a display device that displays information such as images and characters. A liquid crystal display, an organic EL display, or the like can be used as the display 120.

The audio output 130 is a speaker that outputs a melody, a voice, or sound effects.

The storage 140 is configuration by one or more of a RAM (random-access memory), a ROM (read-only memory) or a HD (hard-disk) drive, or the like and stores various programs and information for controlling the various parts of the game machine 10. Specifically, for example, the storage 140 stores a game program of a timing game executed by the game machine 10. The storage 140 also stores the change condition for changing the display position of the judgment line and the direction of movement of the movement objects. The storage 140 has a melody data storage 141 and a sequence data storage 142.

The melody data storage 141 stores the audio data of a melody that is the target in a timing game.

The sequence data storage 142 stores sequence data in which the instructed timing of movement objects and the movement start timing of the judgment line are coded.

A specific example of sequence data according to the present embodiment will now be described.

Figure 4:
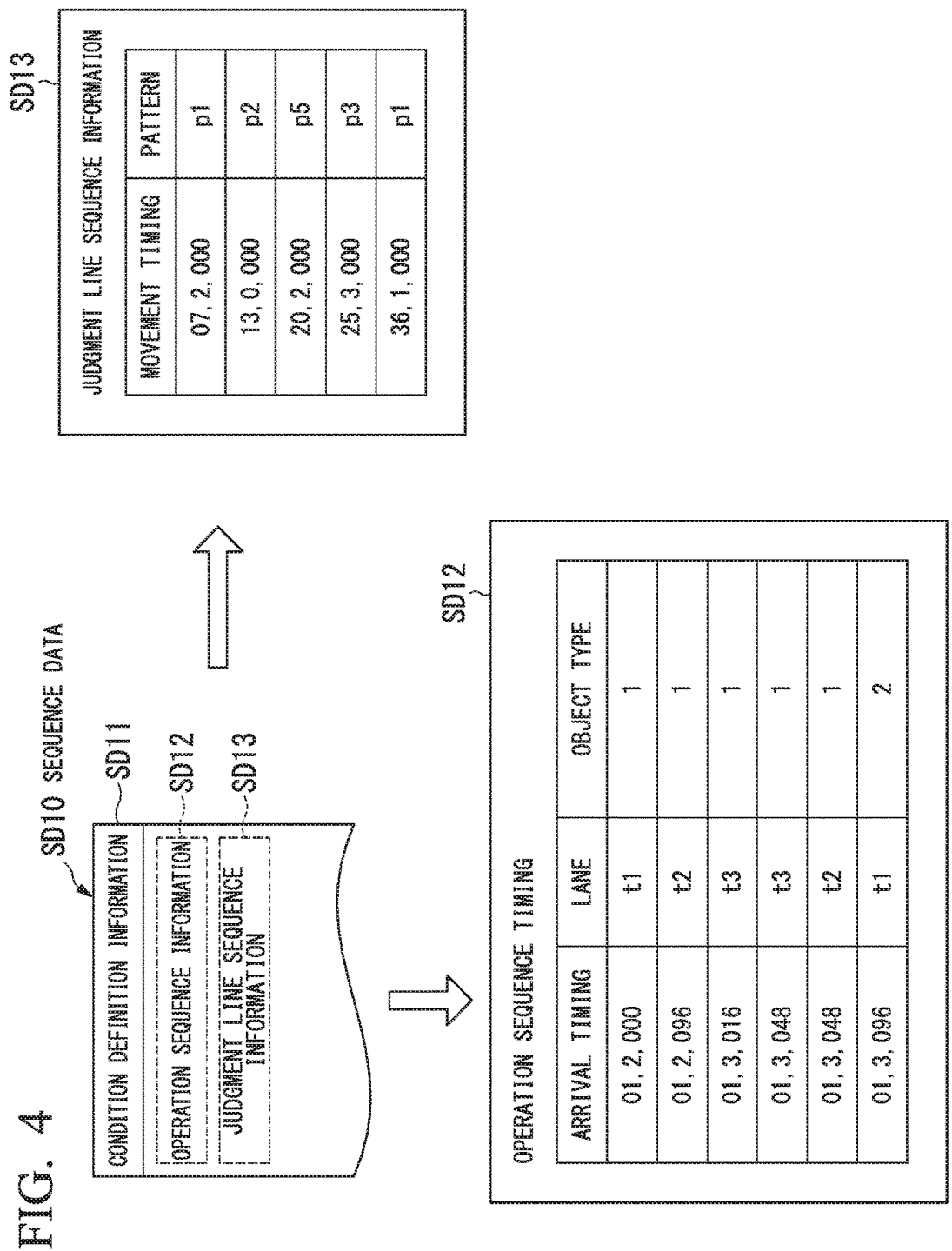
FIG. 4 shows an example of sequence data according to the first embodiment of the present invention.

FIG. 4 shows an example of sequence data according to the present embodiment.

In the example shown in FIG. 4, the sequence data SD10 includes condition definition information SD11, operation sequence information SD12, and judgment line sequence information SD13. The condition definition information SD11 has coded therein a melody ID that identifies the melody and information that specifies various conditions for executing the game, such as the tempo, beat, track, and length of the melody.

The operation sequence information SD12 is information in which the instructed timing of a movement object and the type of the movement object are associated with each other. The operation sequence information SD12 is constituted as a plurality of records, in which the arrival timing information (arrival timing), the lane information (lane), and the object type information (object type) are associated with each other. In the example shown in FIG. 4, this information is coded in sequence from the left as the arrival timing information, the lane information, and the object type information.

The arrival timing information represents the instructed timing of the movement object, that is, the time of arrival of the movement object at the judgment line. The arrival timing information is represented as a time within the melody. Specifically, for example, the arrival timing is coded as the bar number, the number of the beats in each bar, and a value that represents the time within the beat, these being separated by commas. The time within a beat is the elapsed time from the start on that one beat, expressed by dividing the beat uniformly into n units (where n is a positive integer) and specifying the number of units from the start thereof. For example, the arrival timing information is coded as "01, 4, 012", if one beat is uniformly divided into 96 parts (n=96), specifies an operation timing that is the elapsed time of ⅛ (012/96) from the start of the $4^{th}$ beat of the first bar of the melody. The arrival timing information may be coded in units of seconds, for example, rather than units of beats.

The lane information identifies the lane in which the movement object moves. Stated differently, the lane information identifies the path of movement of the movement object. The movement paths for each line, for example, are calculated by a prescribed function that passes through the reference position of the arrival destination of the movement object.

The object type information identifies the type of movement object in accordance with the type of operation and the reward granted as a result of an operation.

Each record of the operation sequence data SD12, in which these types of information are associated with each other, represents the movement of a movement object, of a type represented by the object type information, over a lane represented by the lane information, so as to cause it to arrive at the judgment line at a timing represented by the arrival timing information.

The judgment line sequence information SD13 is information in which the judgment line movement timing and the judgment line pattern are associated with each other. The judgment line sequence information SD13 is constituted by a collection of a plurality of records in which the movement timing information (movement timing) and the pattern information (pattern) are associated with each other. In the example shown in FIG. 4, this information is coded in sequence from the left as the movement timing information and the pattern information.

The movement timing information represents the movement start timing of the judgment line. The movement timing information is coded in the same format as the arrival timing information. The movement timing information may be information representing the movement end timing of the judgment line. Both the movement start timing and the movement end timing or the movement end timing may be coded in the judgment line sequence information SD13.

The pattern information represents the display position and display angle of the judgment line. The pattern information, for example, is coded as identification information of the judgment line display position and display angle. In this case, the center coordinates of the judgment line and the inclination angle thereof in the XY plane and the like corresponding to each pattern are stored beforehand in the storage 140. Specifically, for example, in the case of the judgment line JL10 shown in the game screen GR21 of FIG. 2, regarding each of the patterns PB1 to PB7, the center positions and inclination angles of each of the judgment lines JL11 to JL15 constituting the judgment line JL10 are stored beforehand.

Each record of the judgment line sequence information SD13, in which these types of information are associated with each other, represents starting of the movement of the judgment line at the timing represented by the movement timing information so as to be displayed at the display position and display angle represented by the pattern information.

The operation sequence information SD12 and the judgment line sequence information SD13 may be coded in one file. In that case, each record of the operation sequence information SD12 and the judgment line sequence information SD13 may be arranged in increasing or decreasing sequence, based on the timing represented by the arrival timing information and the timing represented by the movement timing information.

The above completes the description of the sequence data SD10 according to the present embodiment.

The control device 150 has an information processing device such as a CPU (central processing unit) or the like that functions as the control center of the game machine 10. The control device 150 has a game control device 151. The game control device 151, for example, is implemented by the CPU of the game machine 10 executing a game program stored in the storage 140. The game control device 151 reads out the sequence data SD10 corresponding to the melody selected by the user into memory and causes the game to advance, based on the sequence data SD10. The game control device 151 has a first operation acceptor 152, a register 153, a second operation acceptor 154, an evaluator 155, and an output controller 156.

The first operation acceptor 152 accepts operations with respect to the input 110 during the execution of the edit mode. The first operation acceptor 152 analyzes the content of an operation based on the input detected by the input 110.

If an operation analyzed by the first operation acceptor 152 is a pattern registering instruction that instructs so as to register a judgment line pattern, the register 153 writes information representing the instructed pattern into the sequence data SD10, in association with the playback time.

Specifically, for example, in the game screen GR21 shown in FIG. 2, if the pattern PB1 is selected, the playback time displayed at the playback time PT and identification information of the pattern PB1 are temporarily recorded into memory. Then, when the save button SV is pressed, the register 153 codes into the movement timing information of the judgment line sequence information SD13 the playback time that had been recorded into memory. The register 153 also codes into the pattern information of the judgment line sequence information SD13 identification information of the pattern PB1 that had been temporarily recorded into memory. In this manner, the register 153 changes the contents of the sequence data SD10 in accordance with operations made in the edit mode.

In this case, if the instruction content by the operation analyzed by the first operation acceptor 152 does not satisfy a prescribed registering condition, the register 153 does not write information representing the instructed display position and display angle into the sequence data SD10. For example, it can be imagined that, if, as a result of registering a judgment line pattern in accordance with an instruction from the user, movement of the judgment line is too frequent or the movement speed of the judgment line is too fast, there is a possibility that the game will not work. Given that, as one example, the register 153 establishes the time difference between the movement start timing and the movement end timing of the judgment line so that it is longer than a prescribed amount of time. If the time difference between the movement start timing and the movement end timing of the judgment line is longer than the prescribed amount of time, the writing of the pattern of the judgment line into the sequence data SD10 may be allowed. The prescribed amount of time, for example, may be changed, for example, in accordance with the amount of movement of the judgment line, such as making a long movement of the judgment line shorter. In a case in which registering is not suitable, such as if the amount of time difference between the judgment line movement start timing and movement end timing is the same or shorter than the prescribed amount of time, an alert to that effect may be made to the user, by an alert message via the output controller 156. This provides support for the proper registering of the display position and display angle of the judgment line.

The second operation acceptor 154 accepts an operation made to the input 110 in the play mode.

Specifically, the second operation acceptor 154 executes processing to identify the operation target of a touch operation made with respect to the input 110. In this case, the second operation acceptor 154 determines whether or not the touch position detected by the input 110 is the active touch region of a movement object. An active touch region is a region that is established for each movement object, for example, within a prescribed distance from the center coordinates of the movement object. In this case, the active touch region moves accompanying movement of the movement object. If the touch position is within the touch active region of a movement object, the second operation acceptor 154 determines that the movement object having that active touch region is the target of the operation. When this is done, if the there is no movement object within a prescribed region (for example, the vicinity of the judgment line) the second operation acceptor 154 need not perform processing regarding that operation. The second operation acceptor 154 notifies the evaluator 155 of the instructed timing of the movement object that is the operation target and the timing of the touch operation detected by the input 110.

The evaluator 155 evaluates the operation skill during execution of play mode.

The evaluator 155 compares the detected timing notified from the second operation acceptor 154 with the instructed timing and evaluates the operation skill based on the size of the time difference therebetween. In this case, the evaluator 155 may perform evaluation in accordance with the size of the time difference in a plurality of steps. For example, it may evaluate the judgment results if the time difference is at least 0.0 s but less than 0.2 s as "Perfect," if the time difference is at least 0.2 but less than 0.4 s as "Great," if the time difference is at least 0.4 but less than 0.8 s as "Good," and if the time differences is 0.8 s or greater as "Failed."

The output controller 156 controls the audio output by the audio output 130 and the image output by the display 120. For example, in the play mode or the edit mode, if an operation is made to select a melody that is the target for playing or editing, the output controller 156 reads the audio data of the melody that is the target for playing or editing from the melody data storage 141. The read-out melody audio data is then output to the audio output 130 and replayed. The output controller 156 reads out the sequence data SD10 corresponding to the melody that is the target of playing or editing from the sequence data storage 142. The output controller 156 generates the image data of the game screen, which includes the movement objects, lanes, and judgment lines and the like, based on the sequence data SD10. The image data of the game screen is generated over a time range that is somewhat wider than the display range of the display 120. The output controller 156 outputs the generated image data to the display 120, causing it to display the game screen.

The control of the display of the movement objects and the judgment line in the play mode will now be described.

First, the output controller 156 extracts records of the operation sequence information SD12 in which a value of the arrival timing information is included within a pre-scribed time range going forward in time from the playback time. This processing is for identifying the movement objects currently displayed on the display 120 and the movement objects to be displayed on the display 120 in the near future. The playback time is the time kept from the start of the game by a timer of the game machine 10.

Next, the output controller 156 calculates the timing of the appearance on the game screen of a movement object that is caused to be displayed in the near future. Specifically, the output controller 156 references the extracted records of the operation sequence information SD12 and calculates the timing by subtracting a prescribed amount of time (for example, two bars) from the timing indicated by the arrival timing information. Next, the output controller 156 causes the movement object represented by the object type information to appear at a prescribed position on a lane at the calculated timing. After that, the output controller 156, with a reduction in the time difference between the timing indicated by the arrival timing information and the playback time, causes movement so that distance between the judgment line on the movement path and the movement object is reduced. The output controller 156 causes the display position of the movement object and the reference position represented by the judgment line to coincide at the timing represented by the arrival timing information.

In this case, the output controller 156 changes the direction of movement of the movement object based on a change condition stored in the storage 140. Specifically, the output controller 156 periodically determines whether or not the change condition is satisfied. If the change condition is satisfied, the output controller 156 sets a status flag to valid, and if the change condition is not satisfied, it sets the status flag to invalid. The status flag is information indicating whether or not to make valid or invalid the change of the direction of movement of the movement object.

In the present embodiment, the output controller 156 changes the direction of movement of the movement object by lane reversal. Lane reversal is, for example, the rotation of the lane by 180° with the reference position represented by the judgment line as the center. Lane reversal is, for example, at least changing, of the movement components of the movement object, the component that is orthogonal to the judgment line to negative. Also, lane reversal is, for example, changing the movement direction of the part of a lane extending beyond the judgment line, making it a direction in opposition to the movement direction of the part before the extension.

At the timing of the appearance of the movement object, output controller 156 references the status flag and determines whether or not the change of the movement direction of the movement object has been made valid. If the change of the movement direction of the movement object has been made valid, the output controller 156 sets the reversed lane of the lane allocated beforehand in the lane information as the movement path of the movement object. This reversed lane is the lane reversed from the originally set lane with the reversed lane as a reference. Specifically, for example, of the lane LN11 shown in the game screen GR12 of FIG. 1, the upper region from the judgment line JL10 is the lane before reversal, and the lower region from the judgment line JL10 is the reversed lane. The output controller 156 moves the movement object over the reversed lane. By doing this, the output controller 156 can cause the movement object to reach the judgment line not only from the forward direction, but also from the reverse direction.

The output controller 156 may, based on a prescribed no-change condition, prohibit a change of the movement direction of the movement object with respect to the judgment line. A no-change condition is a condition for prohibiting a change of the movement direction of a movement object with respect to the judgment line. In this case, as an example of a no-change condition, the case will be described in which the condition is pre-established that a prescribed amount of time has not elapsed since the last time the status flag value is changed.

In this case, when the value of the status flag is updated, the output controller 156 records the time at which the change was made. The output controller 156 determines whether or not the change condition is satisfied and, if the status flag value is determined to have been updated, it determines whether or not the no-condition is satisfied. That is, the output controller 156 determines whether or not the prescribed amount of time has elapsed since the last time the status flag was updated. If the prescribed amount of time has not elapsed since the last time the status flag was updated, the output controller 156 does not change the value of the status flag. If the prescribed amount of time has elapsed since the last time the status flag was updated, the output controller 156 changes the value of the status flag. By doing this, the game machine 10 suppresses excessive change in the movement direction of the movement object and loss of interest in the game.

The output controller 156 moves the judgment line. Specifically, the output controller 156 extracts records of the judgment line sequence information SD13 in which the values of the movement timing information include a pre-scribed time range from the playback time going forward. Next, it references records of the extracted judgment line sequence information SD13 and identifies the movement end timing at which the prescribed amount of time (for example two bars) has advanced from the timing represented by the movement timing information. Next, at the timing represented by the movement timing information, the output controller 156 starts moving the judgment line toward the pattern represented by the pattern information. After that, with a reduction in the time difference between the identified movement end timing and the playback time, the output controller 156 moves the judgment line so as to approach the pattern represented by the pattern information. Then, at the movement end timing, the output controller 156 causes the judgment line to coincide with the display position and display attitude represented by the pattern information.

In this case, when moving the judgment line, the output controller 156 moves it in accordance with the movement of the judgment line on the movement object lane. For that reason, the display position of the movement object on the game screen is calculated by combining the movement of the movement object on the lane and the movement of the lane that accompanies the movement of the judgment line. For example, considering the case in which, rather than the movement object being moved toward the judgment line on a straight-line lane, the judgment line is rotated, the movement object describes a circular path that accompanies the rotation of the judgment line. In contrast, accompanying the elapse of time, the movement object moves in a straight line on the lane toward the judgment line. In this case, because on the game screen the display position of the movement object is calculated by the combination of these two movements, each movement is done at the same speed, and when the prescribed time interval is sufficiently short, the movement object moves toward the judgment line as it describes a smooth helical curve. In this manner, even with the relatively simple combination of the change in the display angle of the judgment line and relative straight-line movement of the movement object toward the judgment line, it is possible to move the movement object along a curved line on the game screen. If a change in the display position of the judgment line and a curved lane are combined with this, it is possible to represent movement of the movement object on the game screen over a more complex path, smoothly, while changing the speed. As noted above, when the judgment line is moved, by calculating the display position of the movement object based on the change in the relative position between the movement object and the judgment line and on the change in the display position and display angle of the judgment line on the game screen, a more diverse presentation can be made. The prescribed time interval can be arbitrarily set, for example for each processing frame. The time interval for each of these processing frames, for example, can be made ⅓₀ or ⅙₀ of a second, but is not restricted to these prescribed time intervals.

When the judgment line is moved as described above, the output controller 156 may adjust the movement object speed of movement. The output controller 156, for example, may perform control so that the relative speed of the movement object with respect to the judgment line does not change, and may perform control so that the speed of movement of the movement object on the game screen does not change. If the movement speed of the movement object on the game screen is not changed, the output controller 156, for example, may calculate the display position of the judgment line at the instructed timing of the movement object beforehand and may cause the movement object to approach the display position with a uniform speed.

The output controller 156 may, for example, change the speed of the movement object during its movement, in accordance with the movement of the judgment line. For example, it can be imagined that the movement speed is calculated based on the positional relationship between the judgment line and the movement object at the time of appearance of the movement object. However, if the judgment line moves, continuing to move the movement object at the initial speed calculated at the time of appearance will result in the timing of arrival at the judgment line changing. Specifically, if the judgment line is to move toward a movement object, if the movement object is moved toward the judgment line while maintaining the initial speed, the movement object will reach the judgment line at a timing that is earlier than the instructed timing. For that reason, in this case, the output controller 156 performs control to reduce the speed of movement of the movement object, so that it reaches the judgment line at the instructed timing.

In contrast, if the judgment line is to move in the direction away from the movement object, if the movement object is moved toward the judgment line at the initial speed, the movement object reaches the judgment line at a timing that is later than the instructed timing. For that reason, in this case, the output controller 156 performs control to increase the speed of movement of the movement object, so that it reaches the judgment line at the instructed timing.

That is, the output controller 156 calculates the distance between the movement object and the judgment line at a prescribed time interval of, for example, each processing frame and controls the speed of the movement object by calculating the amount of movement (movement speed) in accordance with the distance. In this manner, the output controller 156 may adjust the speed of movement of the movement object in accordance with the movement of the judgment line. This enables a further variety of presentations.

As described above, the judgment line sequence information SD13 may have coded therein the judgment line movement end timing. In that case, the output controller 156 extracts records of the judgment line sequence information SD13 in which the value of the movement timing information is included in a prescribed time range from the playback time going forward. Next, the output controller 156 references the extracted records of the judgment line sequence information SD13 and identifies the movement start timing that is a prescribed period of time (for example, two bars) before the timing represented by the movement timing information. Then, at the identified movement start timing, the movement of the judgment line toward the pattern represented by the pattern information is started. In this manner, even if only one of the movement start time and movement end timing is coded in the judgment line sequence information SD13, both the movement start timing and the movement end timing can be identified and the judgment line can be moved.

The above completes the description of the control of the display of the movement objects and the judgment line in the play mode.

In the edit mode, the output controller 156 generates the game screen in which various editing buttons and the like are disposed, over the background of the game screen in the play mode. In the edit mode, however, the playback time is specified by the user. The user, for example, specifies the playback time by operating the playback/pause button BT, and the scroll bar SB shown in FIG. 2. In the edit mode, the display of objects other than the judgment line such as the movement objects may be omitted. However, by displaying the lanes and movement objects as well, the user can verify beforehand the positioning and movement of movement objects when execution is done in the play mode. When that is done, the output controller 156 may re-calculate the disposition of the movement object in accordance with the result of selection of a judgment line pattern and may cause display of the movement object after the re-calculation. The output controller 156 may play back a part of the melody corresponding to the playback time. When the timing game is advanced in step with a movie, a part of the movie corresponding to the playback time may be played back.

(Game Machine Operation)

Next, the operation of the game machine 10 will be described.

Figure 5:
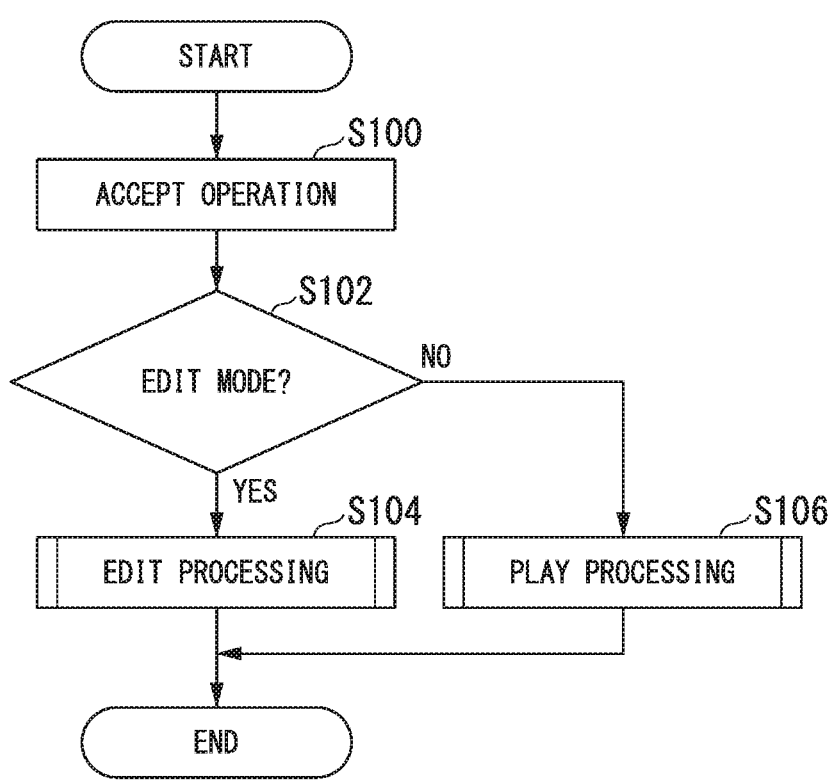
FIG. 5 is a flowchart showing an example of the flow of overall processing by the game machine according to the first embodiment of the present invention.

FIG. 5 is a flowchart showing an example of the flow of the overall processing by the game machine 10 according to the present embodiment.

(Step S100) The control device 150 accepts an operation detected by the input 110. After that, the control device 150 proceeds to the processing of step S102.

(Step S102) The control device 150 determines whether or not the accepted operation is an instruction to execute the edit mode. If execution of the edit mode is instructed (YES at step S102), the control device 150 proceeds to the processing of step S104. If execution of the play mode is instructed (NO at step S102), the control device 150 proceeds to the processing of step S106.

(Step S104) The control device 150 executes the edit mode. After that, the control device 150 ends the processing shown in FIG. 5.

(Step S106) The control device 150 executes the play mode. After that, the control device 150 ends the processing shown in FIG. 5.

Figure 6:
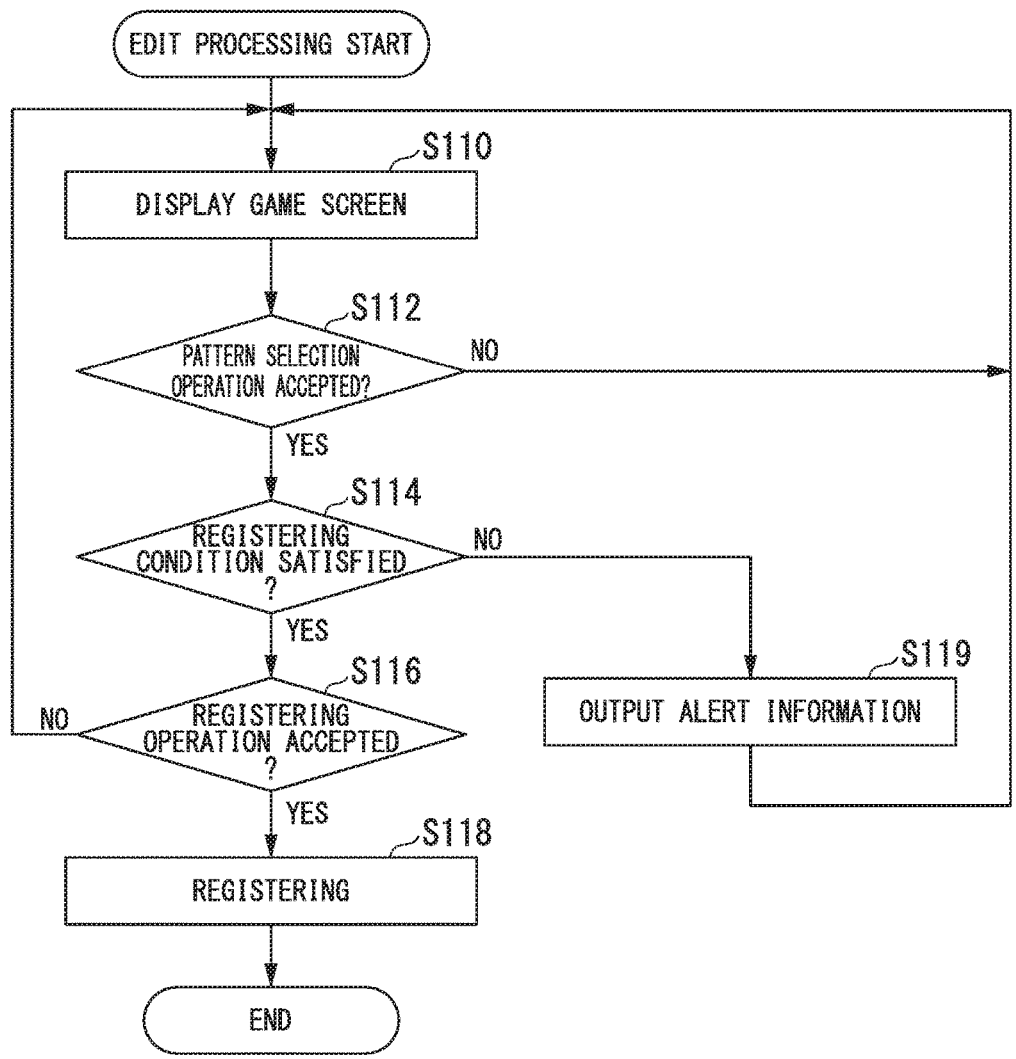
FIG. 6 is a flowchart showing an example of the flow of edit processing by the game machine according to the first embodiment of the present invention.

FIG. 6 is a flowchart showing an example of the flow of editing processing by the game machine 10 according to the present embodiment.

The processing shown in FIG. 6 corresponds to the processing of step S104 in FIG. 5.

(Step S110) The output controller 156 of the control device 150 generates the game screen of the edit mode at the playback time instructed by the user and causes display thereof on the display 120. After that, the control device 150 proceeds to the processing of step S112

(Step S112) The first operation acceptor 152 of the control device 150 determines whether or not the operation detected by the input 110 is a pattern selection operation (for example, an operation of pressing a pattern selection button PB1 to PB7 shown in FIG. 2) that selects the pattern of the judgment line and the timing of the start of the movement to the pattern. If the operation accepted by the first operation acceptor 152 is a pattern selection operation (YES at step S112), the first operation acceptor 152 temporarily records the contents of the pattern selection operation into memory. After that, the control device 150 proceeds to the processing of step S114. If the operation accepted by the first operation acceptor 152 is not a pattern selection operation (NO at step S112), the control device 150 returns to the processing of step S110.

(Step S114) The register 153 of the control device 150 determines whether or not the instruction content by the operation accepted by the first operation acceptor 152 satisfies a prescribed registering condition. If the registering condition is satisfied (YES at step S114), the control device 150 proceeds to the processing of step S116. If the registering condition is not satisfied (NO at step S114), the control device 150 proceeds to the processing of step S119.

(Step S116) The first operation acceptor 152 determines whether or not the operation detected by the input 110 is a registering operation to register a judgment line pattern (for example, an operation of pressing the save button SV shown in FIG. 2). If the operation accepted by the first operation acceptor 152 was a registering operation (YES at step S116), the control device 150 proceeds to the processing of step S118. If the operation accepted by the first operation acceptor 152 was not a registering operation (NO at step S116), the control device 150 returns to the processing of step S110.

(Step S118) The register 153 writes the instruction content of the operation temporarily recorded in memory (that is, the movement start timing and judgment line pattern) into the judgment line sequence information SD13 and stores it into the sequence data storage 142. After that, the control device 150 ends the processing shown in FIG. 6.

(Step S119) The output controller 156 of the control device 150 displays alert information on the display 120, notifying the user that the input instruction does not satisfy the registering condition. After that, the control device 150 returns to the processing of step S110.

Figure 7:
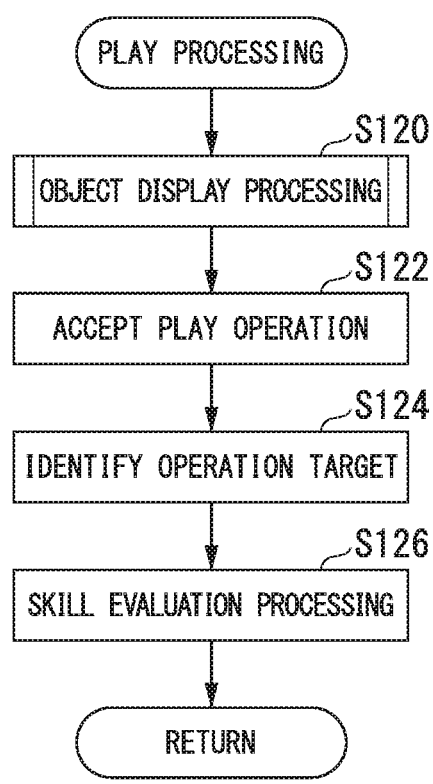
FIG. 7 is a flowchart showing an example of the flow of play processing by the game machine according to the first embodiment of the present invention.

FIG. 7 is a flowchart showing an example of the flow of play processing by the game machine 10 according to the present embodiment.

The processing shown in FIG. 7 corresponds to step S106 in FIG. 5.

(Step S120) The output controller 156 of the control device 150 executes object display processing to display the game screen on the display 120. After that, the control device 150 proceeds to the processing of step S122.

(Step S122) The second operation acceptor 154 of the control device 150 accepts an operation that plays the game detected by the input 110. After that, the control device 150 proceeds to the processing of step S124.

(Step S124) The second operation acceptor 154 of the control device 150 identifies the movement object that is the target of the operation. After that, the control device 150 proceeds to the processing of step S126.

(Step S126) The evaluator 155 of the control device 150 evaluates the skill of the operation, based on the time difference between the instructed timing of the movement object that is the target of the operation and the detected timing detected by the input 110, which detects the operation input. After that, the control device 150 returns to the processing of step S120.

Figure 8:
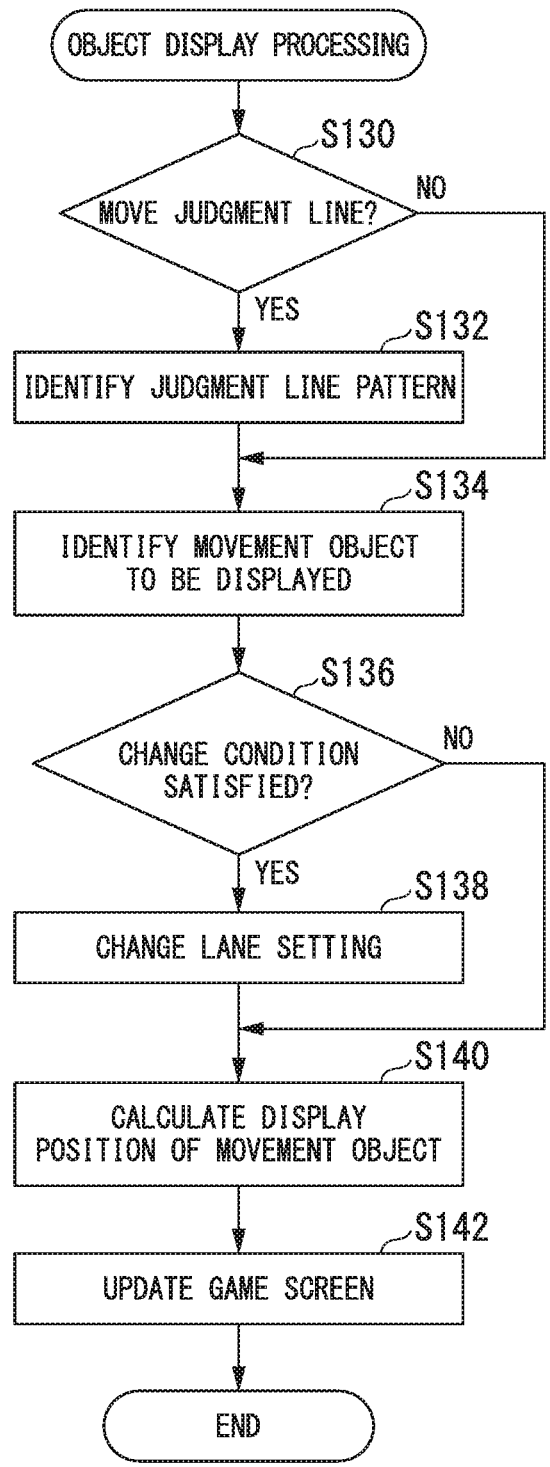
FIG. 8 is a flowchart showing an example of the flow of object display processing by the game machine according to the first embodiment of the present invention.

FIG. 8 is a flowchart showing an example of the flow of object display processing by the game machine 10 according to the present embodiment.

The processing shown in FIG. 8 corresponds to the processing of step S120 of FIG. 7.

(Step S130) The output controller 156 of the control device 150 references the movement timing information of the judgment line sequence information SD13 and determines whether or not the current playback time is the movement timing of the judgment line. If the playback time is the judgment line movement timing (YES at step S130), the control device 150 proceeds to the processing of step S132. If the playback time is not the judgment line movement timing (NO at step S130), the control device 150 proceeds to the processing of step S134.

(Step S132) The output controller 156 references the judgment line sequence information SD13 and identifies the judgment line display pattern. After that, the control device 150 proceeds to the processing of step S134.

(Step S134) The output controller 156 references the arrival timing information of the operation sequence information SD12 and identifies the movement object to be displayed. After that, the control device 150 proceeds to the processing of step S136.

(Step S136) The output controller 156 determines whether or not the change condition is satisfied. If the change condition is satisfied (YES at step S136), the control device 150 proceeds to the processing of step S138. If the change condition is not satisfied (NO at step S136), the control device 150 proceeds to the processing of step S140.

(Step S138) The output controller 156, for example, changes the setting of a lane of a movement object to be caused to appear anew with a prescribed probability. Specifically, a lane is set that is the reverse of the lane set in the lane information of the operation sequence information SD12. After that, the control device 150 proceeds to the processing of step S140.

(Step S140) The output controller 156 calculates the display position of the movement object. After that, the control device 150 proceeds to the processing of step S142.

(Step S142) The output controller 156 displays a game screen on which the judgment line and the movement object are disposed. After that, the control device 150 ends the processing shown in FIG. 8.

(Summary of the First Embodiment)

(1) As described above, the game machine 10 according to the present embodiment has a first operation acceptor 152 that accepts a first operation from a user in the edit mode, a register 153 that registers a display position of the reference indicator on the display screen (for example, a judgment line) based on the first operation accepted by the first operation acceptor 152, a second operation acceptor 154 that accepts a second operation from a user in the play mode, which is different from the edit mode, an output controller 156 that executes processing to display a reference indicator at a display position on the play mode display screen registered by the register 153 and processing to move a movement object in the display screen with respect to the reference indicator, and an evaluator 155 that evaluates the second operation, based on the timing of the movement object reaching the reference indicator (for example, the detected timing) and the second operation timing (for example, the instructed timing).

By doing this, the user can display a reference indicator at a desired position. That is, the game machine 10 enables editing of the display position of the reference indicator. The game machine 10 can therefore improve the degree of freedom in editing the timing game. For that reason, the user can, for example, can make a variety of presentations that are not possible by editing just the instructed timing and movement path of the movement object.

(2) If the current display position of the reference indicator differs from the display position registered in the register 153, the output controller 156 moves the reference indicator to the display position registered in the register 153.

By doing this, the game machine 10 can successively move the reference indicator in the play mode. That is, the game machine 10 enables editing of the movement of the reference indicator. The game machine 10 can therefore cause an improvement in the degree of freedom in editing the timing game. For that reason, the user can make a presentation not only by the positioning of the reference indicator, but also by the movement of the reference indicator. Because the movement object according to the present embodiment moves with respect to the reference indicator, by moving the position of the reference indicator, the trace of movement of the movement object can also be changed.

(3) The register 153 registers at least either the timing of the start of the movement or the timing of the end of the movement of the reference indicator, and the output controller 156 moves the reference indicator based on the timing registered in the register 153.

This enables the user to move the reference indicator with the desired timing. That is, the game machine 10 enables editing of the timing of the movement of the reference indicator. The game machine 10 can therefore enable improvement in the degree of freedom in editing the timing game.

(4) If the time difference between the timing of the start of movement and the timing of the end of movement of the reference indicator is longer than a prescribed amount of time, the register 153 registers at least one of the two timings.

By doing this, because the game machine 10 registers the movement timing, having established a sufficient time for movement of the reference indicator, it can prevent the movement of the reference indicator from becoming extremely fast, causing a loss of interest in the game.

(5) If the time difference between the timing of the start of the reference indicator movement and the timing of the end of the movement thereof is the same or earlier than a prescribed amount of time, the output controller 156 outputs alert information.

By doing this, if sufficient time cannot be established for movement of the reference indicator, the game machine 10 issues an alert to the user, enabling the user to edit appropriately, so that a problem does not occur when the timing game is executed.

(6) The register 153 registers the display angle for displaying the reference indicator on the display screen, and the output controller 156 displays the reference indicator based on the display angle registered by the register 153.

By doing this, the user can display the reference indicator at the desired angle. That is, the game machine 10 enables editing of the display angle of the reference indicator. The game machine 10 can therefore improve the degree of freedom in editing the timing game. For that reason, the user, for example, can make a presentation that includes changing the display angle of the reference indicator.

(7) The register 153 registers the shape of the reference indicator on the display screen, and the output controller 156 displays the reference indicator, based on the shape registered by the register 153.

By doing this, the user can display the reference indicator in a desired shape. That is the game machine 10 makes the shape of the reference indicator editable. The game machine 10, therefore, can improve the degree of freedom in editing the timing game. For that reason, the user can make a presentation that includes, for example, changing the shape of the judgment line.

(8) The output controller 156 causes the movement object to reach the reference indicator from a prescribed direction.

By doing this, the user can, by only changing the display position, the display angle, and the shape and the like of the reference indicator, change the movement of the movement object. For example, even if the lane is a straight line, by changing the display angle of the reference indicator, because the position of the movement object is corrected with a prescribed time interval, for example, every processing frame, in accordance with the inclination of the reference indicator, the movement object can be represented by movement over a smooth curved line.

(9) The register 153, registers at least one of the display position, display angle, and the shape of a plurality of reference indicators to be displayed simultaneously on the display screen, based on one first operation.

By doing this, the user can make a grouped setting of the display position, display angle, and shape of a reference indicator. That is, the game machine 10 can facilitate the editing of the display position, display angle, and shape.

(10) The game machine 10 according to the present embodiment has an output controller 156 that displays an operation acceptor that accepts an operation, and a reference indicator and a movement object that moves with respect to the reference indicator on the display screen and changes the display position of the reference indicator and the movement direction of the movement object, based on a change condition indicated by information stored beforehand in the storage 140, and an evaluator 155 that evaluates the operation, based on the timing of the movement object reaching the reference indicator and the timing of the operation accepted by the operation acceptor.

By doing this, because the game machine 10 changes the display position of the reference indicator and the movement direction of the movement object during the advancement of the game, it causes verification over a wider region of the game screen. That is, the game machine 10 can prevent the game from becoming monotonous and can make diverse presentations.

(11) The output controller 156 changes the display angle of the reference indicator and the movement direction of the movement object based on the change condition.

By doing this, because the game machine 10 changes the display angle of reference indicator and the movement direction of the movement object during advancement of the game, it prevents the game from becoming monotonous and can be make diverse presentations.

(12) The change condition may be the arrival of a prescribed timing.

By doing this, the game machine 10 can change the display position and display angle of the reference indicator and the movement direction of the movement object with a prescribed timing. For example, the game machine 10 can change any one of or a combination of the reference indicator display position and display angle and the movement direction of the movement object with a prescribed timing. The game machine 10 can therefore change the presentation so as to prevent the game from becoming monotonous, and can make diverse presentations.

(13) If the display position and display angle of the reference indicator and the movement direction of the movement object have been changed, the output controller 156 does not change the display position of the reference indicator and the movement direction of the movement object until the elapse of a prescribed amount of time.

By doing this, the game machine 10 can prevent the excessive changing of the movement object movement direction so as to prevent a loss of interest in the game.

(14) The game machine 10 according to the present embodiment has a second operation acceptor 154 that accepts an operation, an output controller 156 that displays on the display screen a reference indicator and a movement object that moves with respect to the reference indicator so as to cause the movement object to arrive from both sides of the reference indicator, and an evaluator 155 that evaluates an operation, based on the timing of the movement object reaching the reference indicator and the timing of the operation accepted by the operation acceptor.

By doing this, by causing the movement object to arrive from both sides of the reference indicator, the game machine 10 can cause verification of both sides of the reference indicator. Also, because the game machine 10 can move the movement objects from both sides of the reference indicator, it can make a variety of presentations. When a movement object is caused to arrive from one side of the reference indicator, the user becomes accustomed to the adjustment of timing, so that the game becomes monotonous. However, because the game machine 10 causes arrival of movement objects from both sides of the reference indicator, it can achieve a different operational feel. The game machine 10 can therefore heighten the interest of the game.

(15) A game program according to the present embodiment is for the purpose of causing a computer function as the game machine 10 as noted above in (1) to (14).

By doing this, the game program can achieve various operational effects such as described above regarding the game machine 10.

Second Embodiment
(Game System Overview)

The second embodiment of the present invention will now be described. In the present embodiment, constituent elements that are the same as in the above-noted embodiment are assigned the same reference symbols, and the descriptions thereof will be incorporated herein.

A game system 1A according to the present embodiment executes a timing game, similar to the game system 1 of the first embodiment. However, whereas a game system 1 according to the first embodiment provides a game by the game machine 10, constituted to encompass the computational processing for executing the game and the user interface together as one, the game system 1A according to the present embodiment differs by providing a game as a so-called cloud game. In a cloud game, the computational processing to execute the game is performed on a server device, and a user interface for operating the game is provided in a terminal device connected to the same network N as the server device.

(Game System Configuration)

Next, the configuration of the game system 1A will be described.

Figure 9:
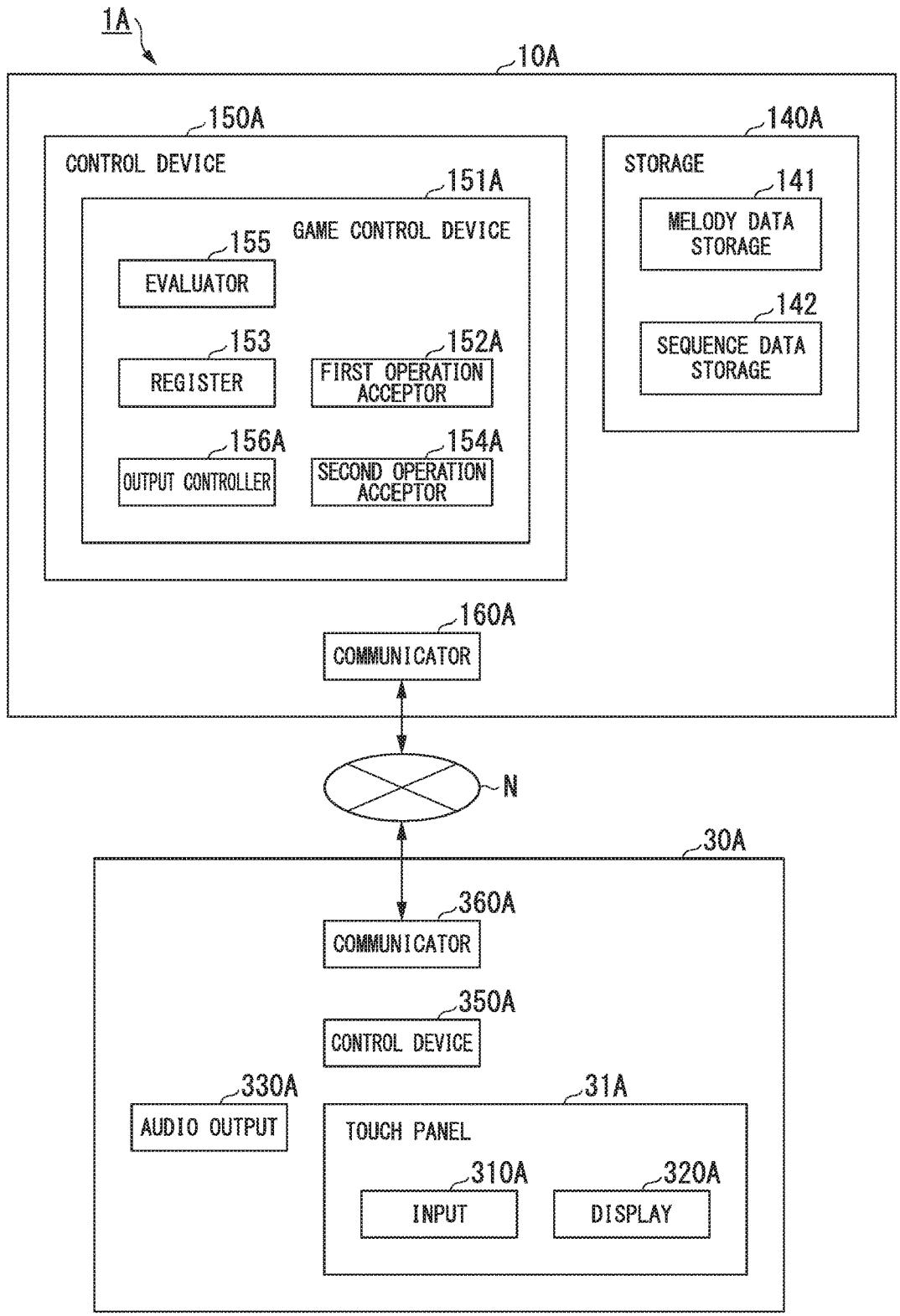
FIG. 9 is a block diagram showing the functional configuration of a game system according to a second embodiment of the present invention.

FIG. 9 shows an example of the overall configuration of the game system 1A according to the present embodiment.

The game system 1A has a game machine 10A and a one or more terminal devices 30A. The terminal device 30A has a touch panel 31A. The game machine 10A and the terminal device 30A are connected to the network N, and can mutually send and receive information. The network N includes an information communication network constituted by, for example, the Internet, a WAN (wide area network), a LAN (local area network), a dedicated communication line, or a combination thereof.

Although FIG. 9 shows one device as an example of the game machine 10A, this is not a restriction, and it may be constituted by a plurality of devices, in which case, as will be described later, various functions may be distributed among the various devices.

The game machine 10A is a server device that performs computational processing of the game. The game machine 10A receives operation information representing operations of a user from the terminal device 30A, and performs processing in accordance with the received operation information. The game machine 10A distributes the video and audio result of computation to the terminal device 30A by, for example, streaming.

The terminal device 30A is an electronic device, such as a commercial game machine such as an arcade game machine, an electronic device such as, for example, a game machine for home use, a portable game machine, a personal computer, a mobile telephone, a tablet personal computer, a smartphone, a PHS (Personal Handy-phone System), terminal device, or a PDA (personal digital assistant). The terminal device 30A receives video and audio from the game machine 10A and displays a game screen and plays back the game audio. The terminal device 30A transmits to the game machine 10A operation information representing user operations made with respect to the game screen displayed on the touch panel 31A.

(Game Machine Configuration)

Next, the configuration of the game machine 10A will be described.

The game machine 10A has a storage 140A in place of the storage 140 and a control device 150A in place of the control device 150 according to the first embodiment. The game machine 10A further has a communicator 160A.

The communicator 160A transmits and receives various information with the terminal device 30A via the network N.

The storage 140A, similar to the storage 140, stores various information. However, the storage 140A differs from the storage 140 by storing a game program that corresponds to a cloud game.

The control device 150A has a game control device 151A in place of the game control device 151. The game control device 151A has a first operation acceptor 152A in place of the first operation acceptor 152, a second operation acceptor 154A in place of the second operation acceptor 154, and an output controller 156A in place of the output controller 156.

The game control device 151A, similar to the game control device 151, performs computational processing to advance the game. The game control device 151A is implemented by a CPU of the game machine 10A executing a game program stored in the storage 140A.

The first operation acceptor 152A, similar to the first operation acceptor 152, accepts an operation from a user in the edit mode. However, the first operation acceptor 152A differs from the first operation acceptor 152 in that it acquires an operation input to the touch panel 31A of the terminal device 30A via the communicator 160A.

The second operation acceptor 154A, similar to the second operation acceptor 154, accepts an operation from a user in the play mode. However, the second operation acceptor 154A differs from the second operation acceptor 154 in that it acquires an operation input to the touch panel 31A of the terminal device 30A via the communicator 160A.

The output controller 156A, similar to the output controller 156, outputs image data representing a game screen and audio data representing audio. However, the output controller 156A differs from the output controller 156 in that it outputs image data and audio data to the display 320A and the audio output 330A of the terminal device 30A via the communicator 160A.

(Terminal Device Configuration)

Next, the configuration of the terminal device 30A will be described.

The terminal device 30A has a touch panel 31A, an audio output 330A, a control device 350A, and a communicator 360A. The touch panel 31A has an input 310A and a display 320A.

The input 310A, the display 320A, and the audio output 330A are, respectively, similar to the input 110, the display 120, and the audio output 130.

The communicator 360A has a communication IC and transmits and receives various information with the game machine 10A, via the network N.

The control device 350A has an information processing device such as a CPU that functions as the control center of the terminal device 30A and controls the various parts of the terminal device 30A. The control device 350A transmits operation inputs detected by the input 310A to the game machine 10A, via the communicator 360A. The control device 350A controls the receiving of audio data by the communicator 360A and causes playback by the audio output 330A of the audio represented by the received audio data. The control device 350A controls the receiving of the image data by the communicator 360A and causes display by the display 320A of the game screen represented by the received image data.

In this manner, the arbitrary constituent elements of the game machine 10 according to the first embodiment may be separated into separate devices. Also, the various functional parts of the game machine 10 may be distributed or collected in an arbitrary number of computers, in accordance with the cloud environment or network environment, the number scale in number of users, and the number of pieces of and specifications of the hardware provided to constitute the game system.

Although FIG. 9 shows the example of the game machine 10A having a melody data storage 141, the audio data may be transmitted in real time. The terminal device 30A, for example, may download audio data of a melody selected by a user into its own device and store it in storage before the start of the game. In this case, the terminal device 30A may update the game screen in real time, based on the image data transmitted from the game machine 10A, while playing back the audio data stored in the storage of its own device.

MODIFIED EXAMPLES

Although embodiments of the present invention have been described above with references made to the drawings, the specific configuration is not restricted to the above and includes designs and the like within the scope of the spirit of the present invention. For example, the various elements described in the first and second embodiments can be arbitrarily combined.

For example, the game machines 10, 10A of the above-described embodiments can be implemented by a computer operated by the user, can be implemented by a server device that communicates with a terminal operated by the user, and can be implemented as a game system by a combination of a terminal operated by the user and a server that communicates with that terminal. The game machine 10 of the above-described first embodiment can be implemented as a non-portable game machine such as a consumer game machine or home-use game machine, a game machine that is a portable information terminal known as a portable game machine, a game machine known as an arcade game machine or commercial game machine, or a personal computer or tablet personal computer that executes a game. For example, the game system 1A and the game machines 10, 10A of the above-described embodiments can be implemented as a game method, implemented as a game program caused to be run on the computer of the game system 1A and game machines 10, 10A. This game program may be embedded in the game system 1A and game machines 10, 10A beforehand, or, for example, may be distributed along with an installer and subsequently installed into the game system 1A and game machines 10, 10A.

First Modified Example

The registering operations in the edit mode in the above-described embodiments are not restricted to operations that select the pattern of the judgment line. The change condition is not restricted to a condition regarding the position of the judgment line as described above. The following is a description, incorporating the configuration of the game machine 10 of the first embodiment, of variation examples of the game machine 10 and the game machine 10A. The various constituent elements of the variation example, however, are not restricted to being constituent elements of the game machine 10.

First, a variation example of the registration operation will be described.

Figure 10:
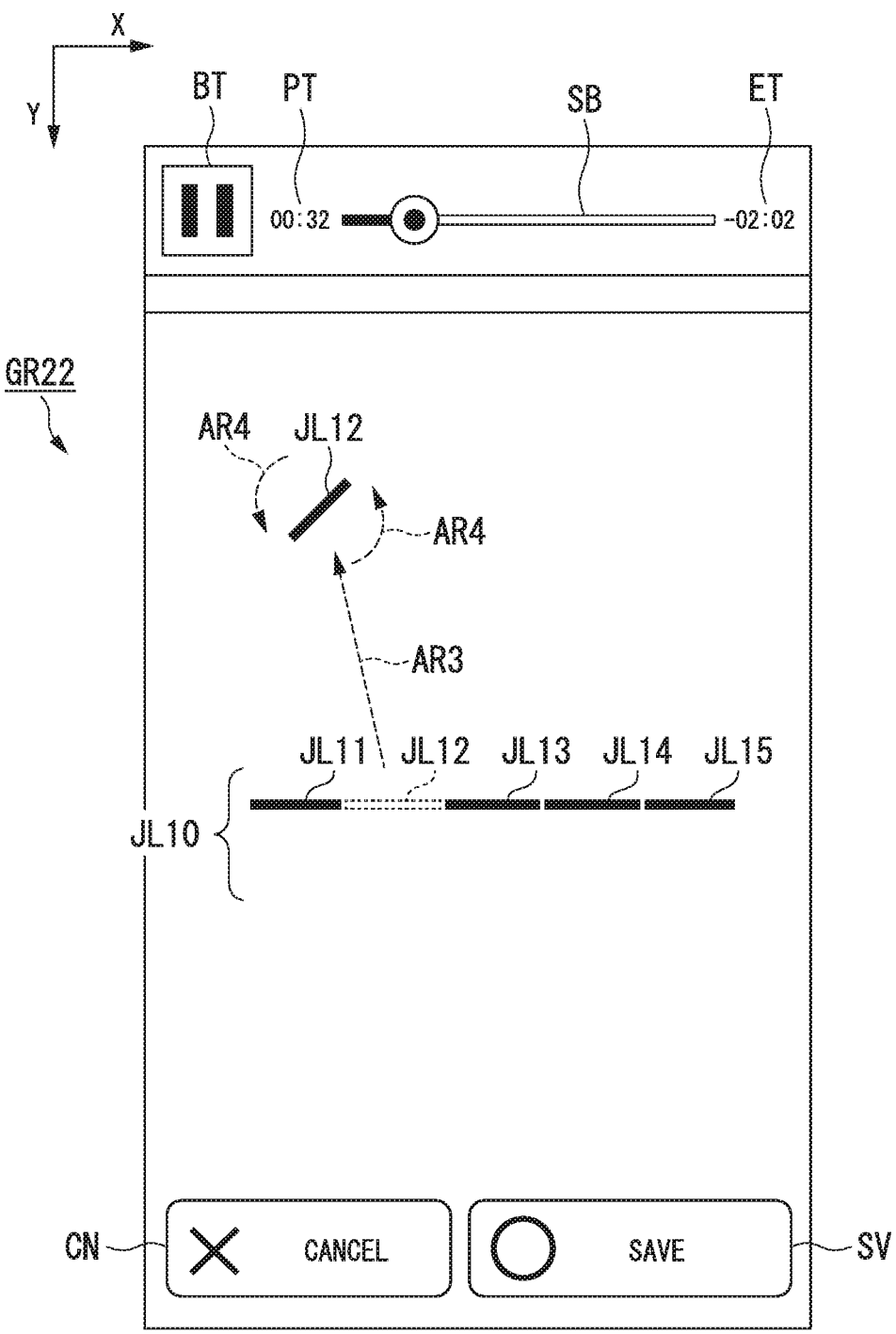
FIG. 10 shows a first variation example of the game screen in the edit mode.

FIG. 10 shows a first variation example of the game screen in the edit mode.

In the game screen GR22 shown in FIG. 10 the game machine 10 provides a function that enables the user not only to register a specific pattern of the display position and display angle of the judgment line JL10, but also to make an arbitrary registration. In the game screen GR22, the game machine 10 provides a function that sets the display position and display angle of the judgment lines JL11 to J15 individually. If the display position is to be registered in the game screen GR22, the user makes a touch operation on the judgment line of JL11 to JL15 that is the target for registration and, for example, slides it to the desired position along the direction of the arrow AR3, thereby enabling setting of the display position. If the display angle is to be registered in the game screen GR22, the user makes a two-finger touch operation on the judgment line of JL11 to JL15 that is the target for registration and, for example, slides each finger in the counterclockwise direction (arrow AR4), thereby enabling the user to set the display angle.

The method of setting the display position and display angle of the judgment lines JL11 to JL15 is not restricted to the above-noted method. For example, the game machine 10 may accept an input as the coordinate values representing the display position or the value of the display angle. If the value θ of the display angle is accepted, the display angle θ of the judgment line may represent the rotational angle in the clockwise direction with respect to the horizontal-direction coordinate axis (X-axis direction). In this case, a display angle with a positioning rising to the right is an angle in the second quadrant (90°<θ<180°) or the fourth quadrant (270°<θ<360°), and a display angle with a position rising to the left is an angle in the first quadrant (0°<θ<90°) or the third quadrant (180°<θ<270°). For the case of the display angle in the first quadrant or fourth quadrant, the lanes connected to each of the judgment lines JL11 to JL15 exist above the judgment lines JL11 to JL15. In this case, the Y-axis direction speed components of the movement objects that move on each of the lanes are positive values. In contrast, for the case of an angle in the second quadrant or third quadrant, the lanes connect to each of the judgment lines JL11 to JL15 exist below the judgment lines JL11 to JL15. In this case, the Y-axis direction speed components of the movement objects that move on each of the lanes are negative values. That is, for the case of a display angle that is an angle in the first quadrant or the fourth quadrant, the lanes are reversed from the case of a display angle that is an angle in the second quadrant or the third quadrant. In this manner, by making the display angle settable, it is also possible to reverse the lanes.

In addition to what is described above, the game machine 10 may accept a change of the display size or a change of the shape of the judgment lines JL11 to JL15 and may register the change in the sequence data SD10. Also, similar to enabling grouped registration of the display position and display angle of a plurality of judgment lines, such as in the first embodiment, grouped registration of the display position, the display angle, and the display size and shape of a plurality of judgment lines may be enabled. The game machine 10 may enable registration of the rotational direction when the judgment line rotational movement, movement speed, and angle are changed.

Second Variation Example

Next, a variation example of the change condition will be described.

Figure 11:
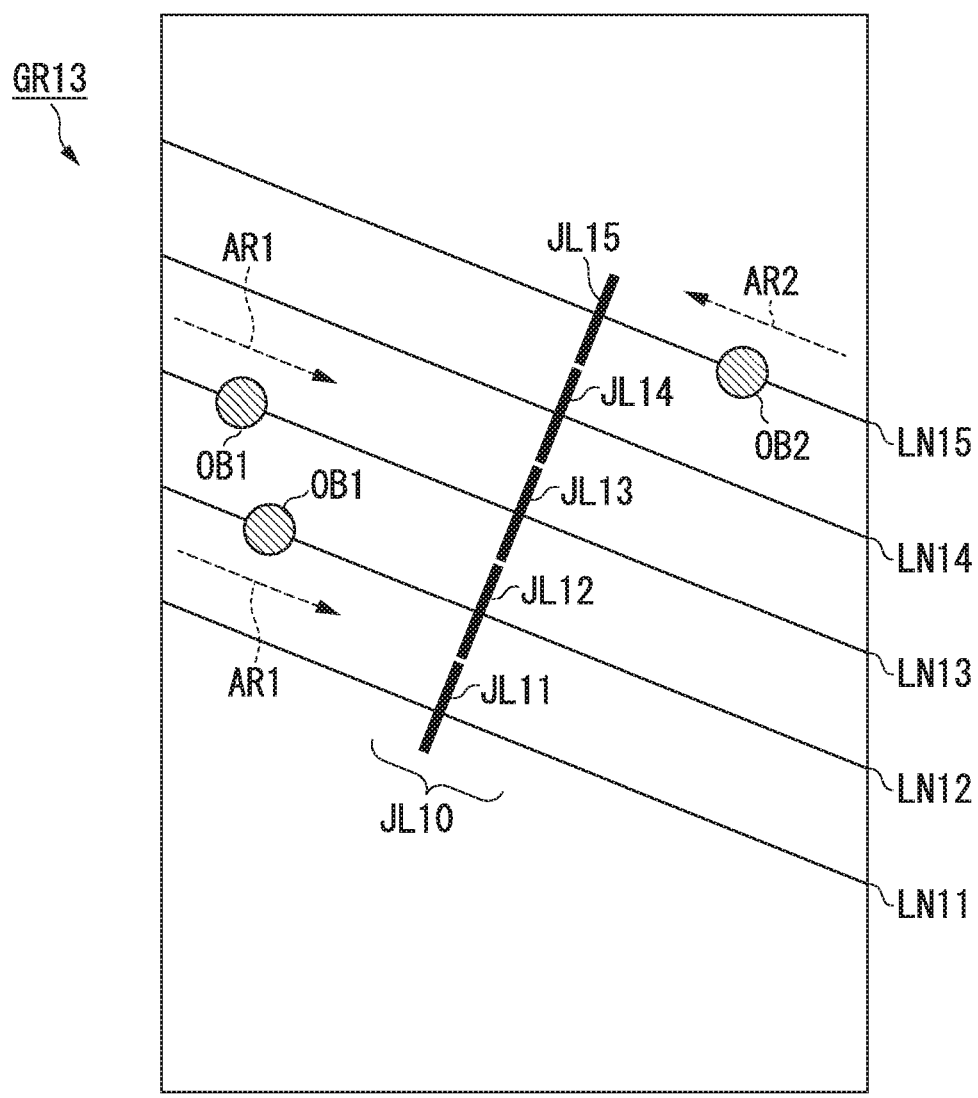
FIG. 11 shows a first variation example of the game screen in the play mode.

FIG. 11 shows the first variation example of the game screen in the play mode.

The first variation example of the change condition is the judgment line being at a prescribed display angle.

As described above, the judgment line indicates the direction when the movement object reaches the reference indicator, and the movement object arrives at the reference indicator from a directional orthogonal to the judgment line. However, in a direction orthogonal to the judgment line, if there is not sufficient space on the game screen, it might become difficult to verify the movement of the movement object, thereby increasing the level of difficulty of the game more than is necessary. Given this, on both sides of the judgment line orthogonal thereto, by reversing the lane if there is sufficient space on the game screen, in addition to heightening interest in the game, verification of the movement of the movement object is facilitated.

Specifically, for example, if the judgment line JL10 is positioned in the vicinity of the center in the X-axis direction, as shown in the game screen GR13 of FIG. 11, if the display angle of the judgment line JL10 generally coincides with the Y-axis direction, because there is approximately the same amount of space on both sides thereof (that is, on the left side and the right side of the game screen GR13), the game machine 10 may generate a reverse-direction movement object OB2. In the same manner, if the judgment line JL10 is positioned in the vicinity of the center in the Y-axis direction, as shown in the game screen GR12 of FIG. 1, if the display angle of the judgment line JL10 generally coincides with the X-axis direction, because there is approximately the same amount of space on both sides thereof (that is, on the upper side and the lower side of the game screen GR13), the game machine 10 may generate a reverse-direction movement object OB2. Generally the same amount of space, for example, means that in the normal line direction to the judgment line JL10, the distance to the edge of the game screen from the reference position indicated by the judgment line JL10 is generally the same on both sides of the judgment line JL10.

In this manner, in addition to the display position of the judgment line, the display angle of the judgment line may be added to the change condition. By doing this, the game machine 10 facilitates verification of the movement of a movement object.

Third Variation Example

Figure 12:
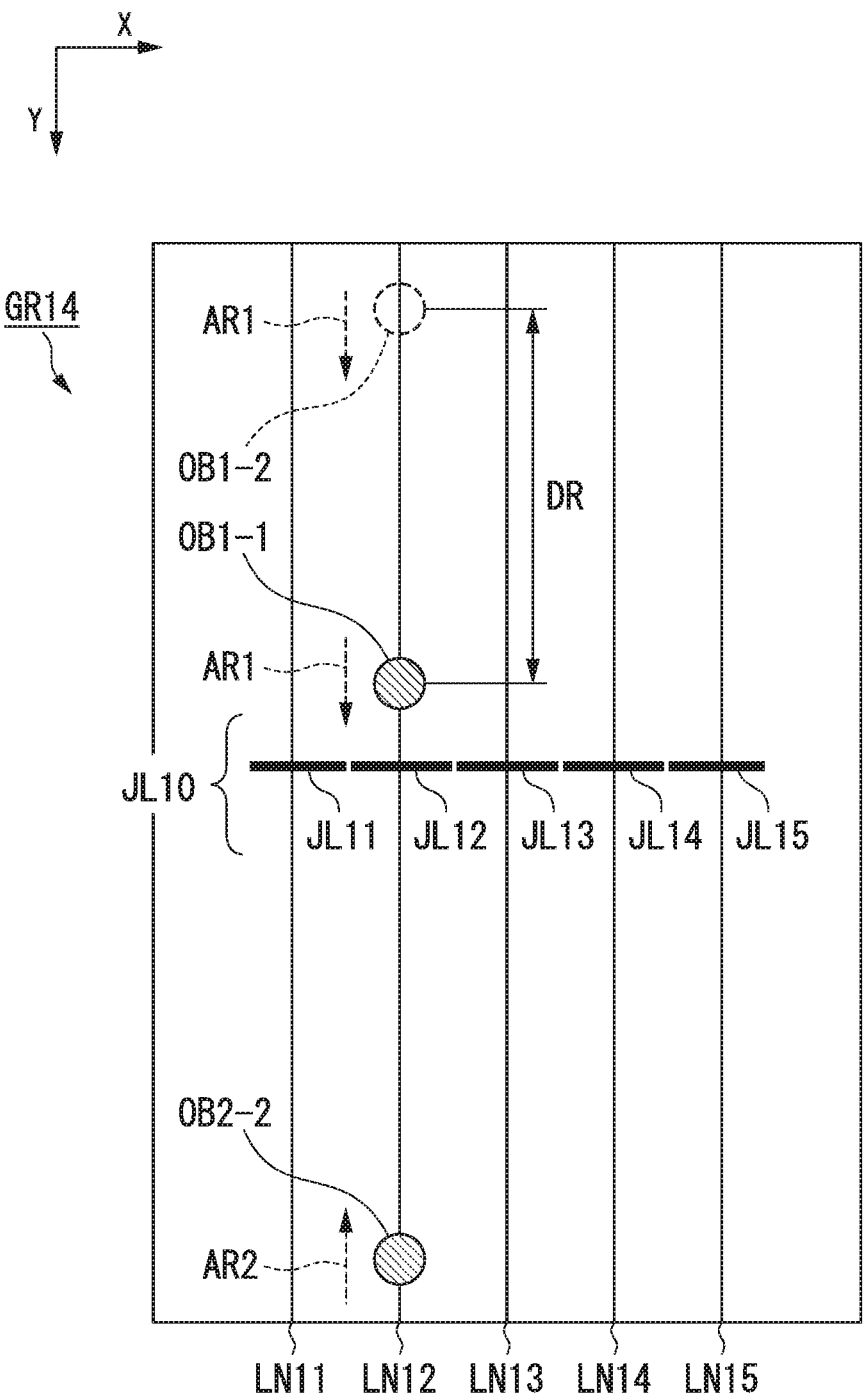
FIG. 12 shows a second variation example of the game screen in the play mode.

FIG. 12 shows a second variation example of the game screen in the play mode.

The second example of the change condition is the difference in the timing of two movement objects reaching the judgment line successively in time being greater than a prescribed amount of time. That is, the second example of the change condition is the time interval between the instructed timings indicated in a timing game being space apart.

If a movement object is to reach the judgment line from the reverse direction, it is necessary to verify the movement of the movement object over a broader range than the case of arriving from only one direction. The result is that, although it is possible to heighten the interest in the game, making such a change suddenly might confuse the user. Given this, by reversing the lane when the interval between instructed timings is spaced apart, it is possible to heighten interest in the game and also have the user prepare for the lane reversal.

Specifically, for example, as shown in the game screen GR14 of FIG. 12, an interval of DR exists between the two movement objects OB1-1 and OB1-2 that successively reach the judgment line JL10. If the interval DR corresponds, for example, to at least a prescribed amount of time, such as 0.4 s, the game machine 10 reverses the lane of the movement object OB1-2 and causes the display of the reverse-direction movement object OB2-2.

In this manner, the change condition may be the timing difference of two movement objects arriving at the reference position successively in time being larger than a prescribed amount of time. By doing this, the game machine 10 can change the display position of the reference indicator and the movement direction of the movement object, without imparting an unnatural feeling to the user.

Four Variation Example

Figure 13:
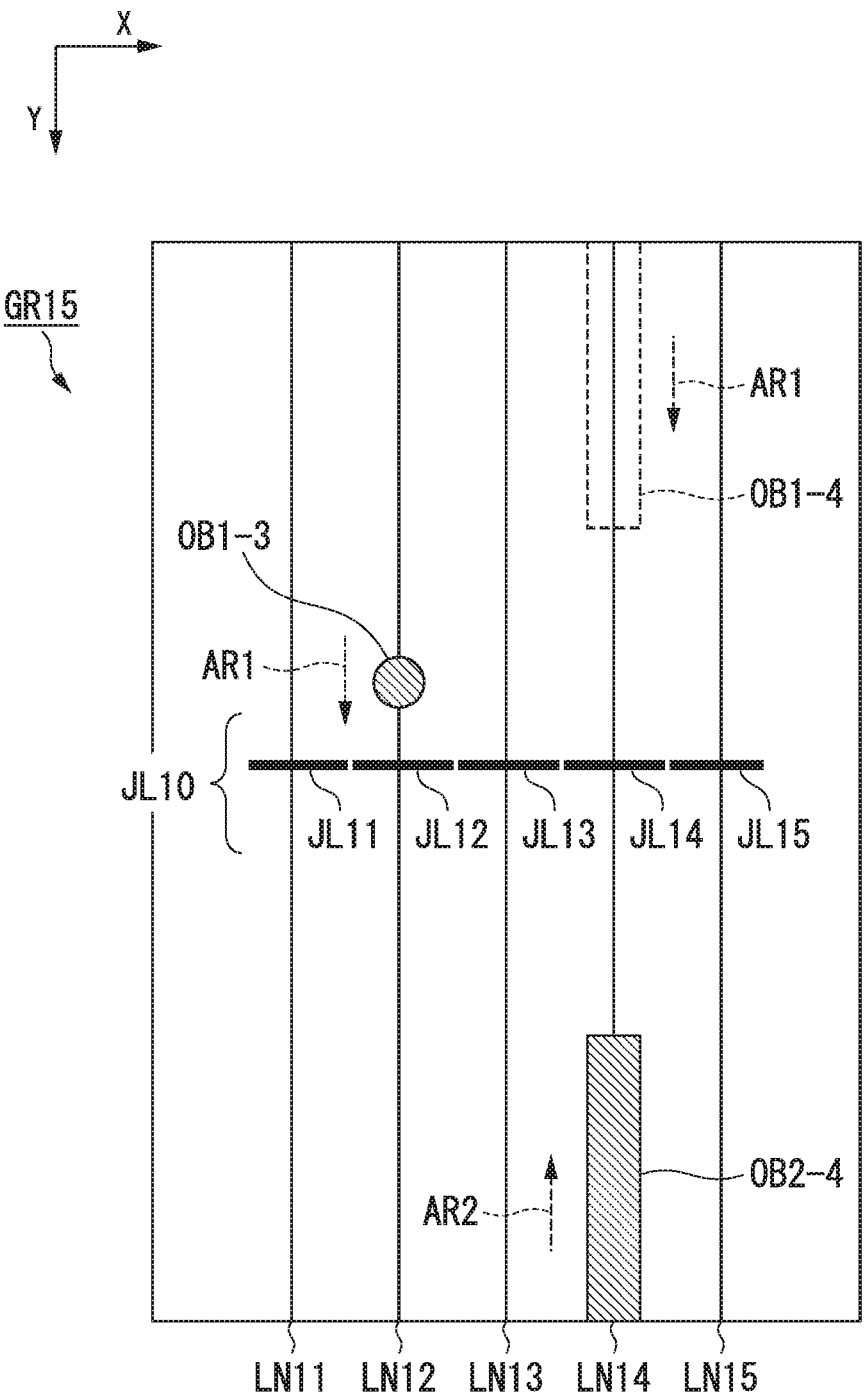
FIG. 13 shows a third variation example of the game screen in the play mode.

FIG. 13 shows the third variation example of a game screen in the play mode.

The third example of the change condition is the types of two movement objects reaching the judgment line successively in time being different. That is, the third example of the change condition is the operation type instructed previously in the timing game and the operation type instructed immediately thereafter being different.

As described above, if the movement direction of a movement object is changed suddenly, the user might become confused. Given this, by reversing the lane at the time of changing the type of the movement object, the unnatural feeling accompanying the lane reversal can be reduced.

Specifically, for example, in the game screen GR15 of FIG. 13, the types of the two movement objects OB1-3 and OB1-4 that reach the judgment line JL10 successively in time are different. Given this, the game machine 10 reverses the movement object OB1-4 with a prescribed probability, and causes display of the reversed-direction movement object OB2-4.

In this manner, the change condition may be the type of two movement objects that reach the reference indicator successively in time being different. By doing this, the game machine 10 can change the display position of the reference indicator and the direction of movement of the movement object, without imparting a feeling of unnaturalness to the user.

Fifth Variation Example

Figure 14:
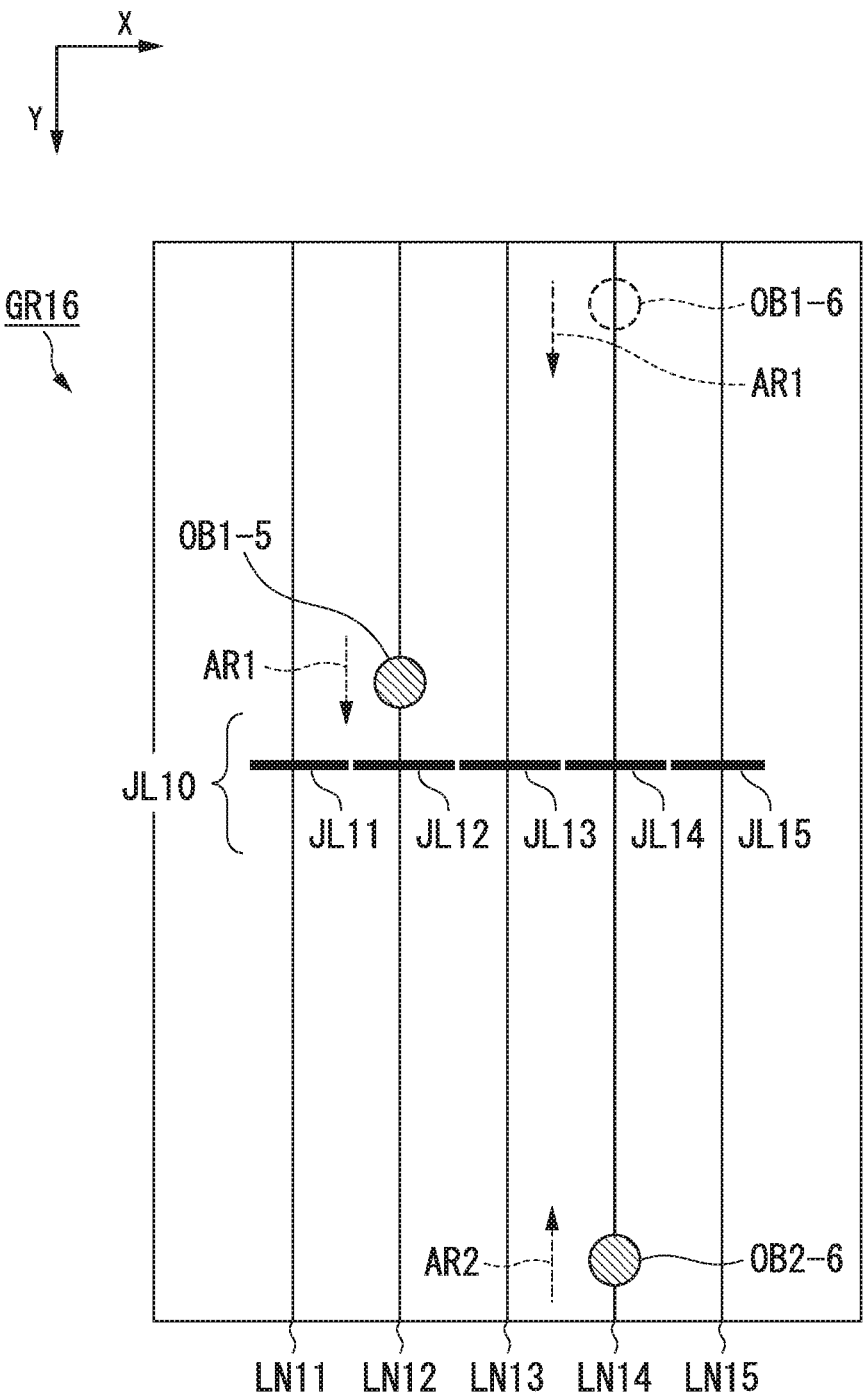
FIG. 14 shows a fourth variation example of the game screen in the play mode.

FIG. 14 shows the fourth variation example of the game screen in the play mode. The fourth example of the change condition is two movement objects that reach a judgment line successively in time reaching mutually different judgment lines. That is, the fourth example of the change condition is the reference position that the previous movement object reaches and the reference position reached by a movement object immediately thereafter being mutually different.

As described above, if the movement direction of the movement object is changed suddenly, the user might become confused. Given this, by reversing the lane if a movement object reaches a judgment line that is different from the immediately previous movement object, the unnatural feeling accompanying the lane reversal can be reduced.

Specifically, for example, in the game screen GR16 of FIG. 14, the two movement objects OB1-5 and OB1-6 are movement objects that reach the judgment line JL10 successively. However, whereas the forward-direction movement object OB1-5 moves on the lane LN12 and reaches the judgment line JL12, the forward-direction movement object OB1-6 moves on the lane LN13 and reaches the judgment line JL14. In this manner, the movement objects OB1-5 and OB1-6 differ regarding the reference positions they reach. Given this, the game machine 10 reverses the lane of the movement object OB-6 with a prescribed probability and displays the reverse-direction movement object OB2-6. In this manner, a change of the reference position or the lane may be included in the change condition.

In this manner, the change condition may be that two movement objects that reach a reference indicator successively in time reaching mutually different reference indicators. Doing this, the game machine 10 can change the display position of the reference indicator and the direction of movement of the movement object, without imparting an unnatural feeling to the user.

Sixth Variation Example

Next, a variation example of the no-change condition will be described.

Figure 15:
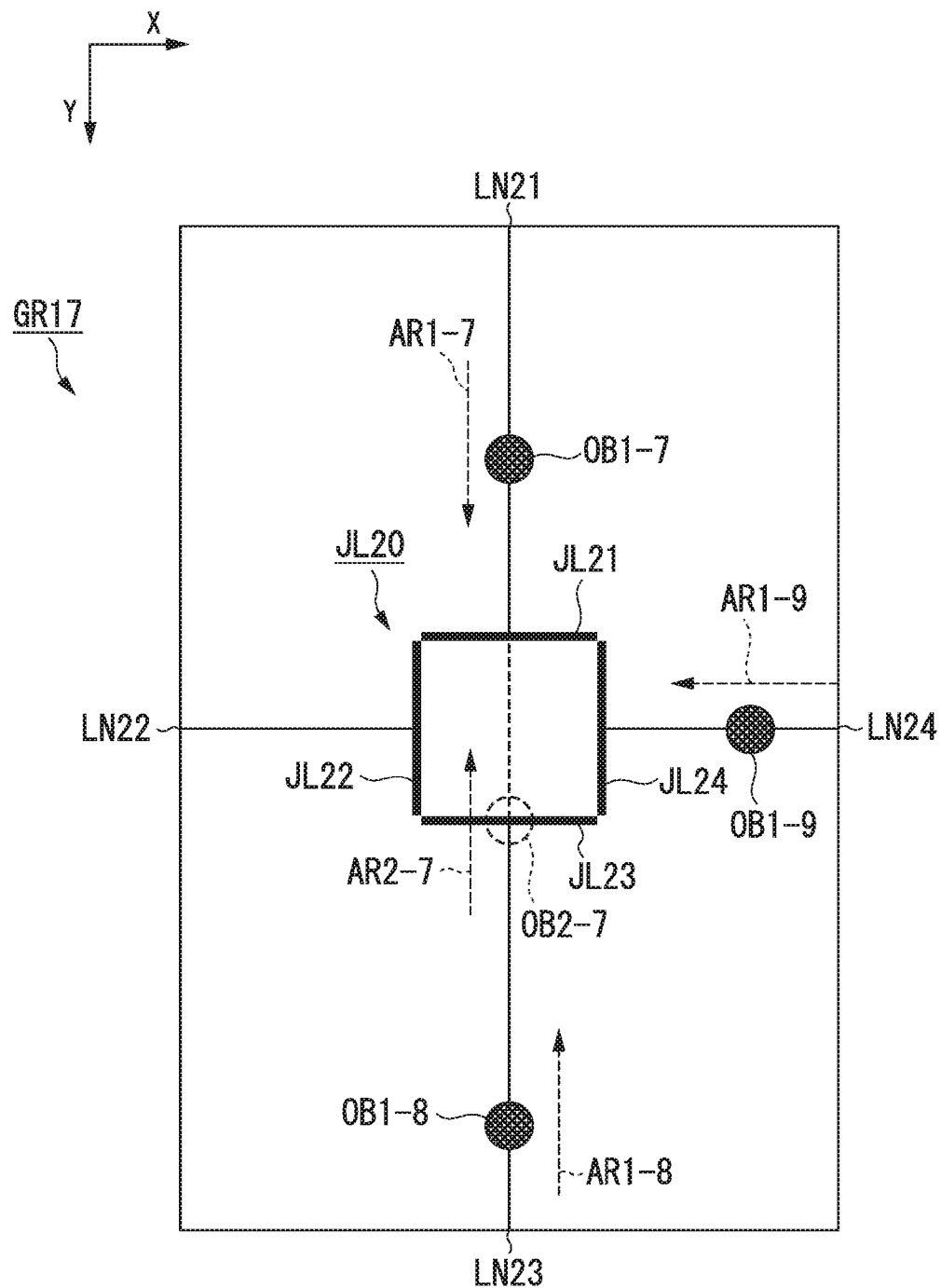
FIG. 15 shows a fifth variation example of the game screen in the play mode.

FIG. 15 shows the fifth variation example of the game screen in the play mode. Depending upon the display position and display angle of the judgment line, there is a possibility that on the movement path of a movement object that reaches a certain judgment line there exists another judgment line that is different from that certain judgment line. In this case, because it is difficult for the user to grasp the instructed timing of the movement object, there is a possibility that interest in the game will be lost. Given this, if a reverse-direction lane intersects with a judgment line that is different from the judgment line that the movement object would normally reach, lane reversal is prohibited. Conversely, if a forward-direction lane intersects a judgment line that is different from the judgment line that the movement object would normally reach, lane reversal is prohibited. In the following, although the case of prohibiting lane reversal is described as one example, the case in which lane reversal release is prohibited would be the same.

Specifically, for example, in the game screen GR17 shown in FIG. 15, four judgment lines, JL21 to JL24, are disposed on a rectangle. Lanes LN21 to LN24 are connected, respectively to the judgment lines JL21 to JL24. In this case, because the judgment lines JL21 to JL24 are disposed on a rectangle, if the lanes LN21 to LN24 are reversed, they cross with the judgment lines JL21 to JL24 corresponding to the opposite sides of the rectangle. For example, if the lane LN21 connected to the judgment line JL21 is reversed, the reversed lane crosses with the judgment line JL23, which is opposite from the judgment line JL21.

The game screen GR17 shows the forward-direction movement object OB1-7 that moves on the judgment line JL21, and when the judgment line JL21 is reversed (for example, the broken line extending from the lane LN21), the reverse-direction movement object OB2-7 corresponding to the forward-direction movement object OB1-7 cuts across the judgment line JL23 before reaching the judgment line JL21. In this case, it is difficult for the user to judge whether to make an operation corresponding to the reverse-direction movement object OB2-7 at the timing of its arrival at the judgment line JL23 or to make the operation at the timing of its arrival at the judgment line JL21. In the same manner, the judgment is also difficult in the case of partial overlap of a reversed lane and another lane. To avoid situations such as this, crossing or approaching between a lane and another object or lane may be established as the no-change condition.

For a similar reason, if a lane connected to a judgment line that is the target for registration crosses with another judgment line or lane, the register 153 may issue an alert and not accept that registration operation.

Seventh Variation Example

Next, another example of a movement object and a reference indicator will be described.

Figure 16:
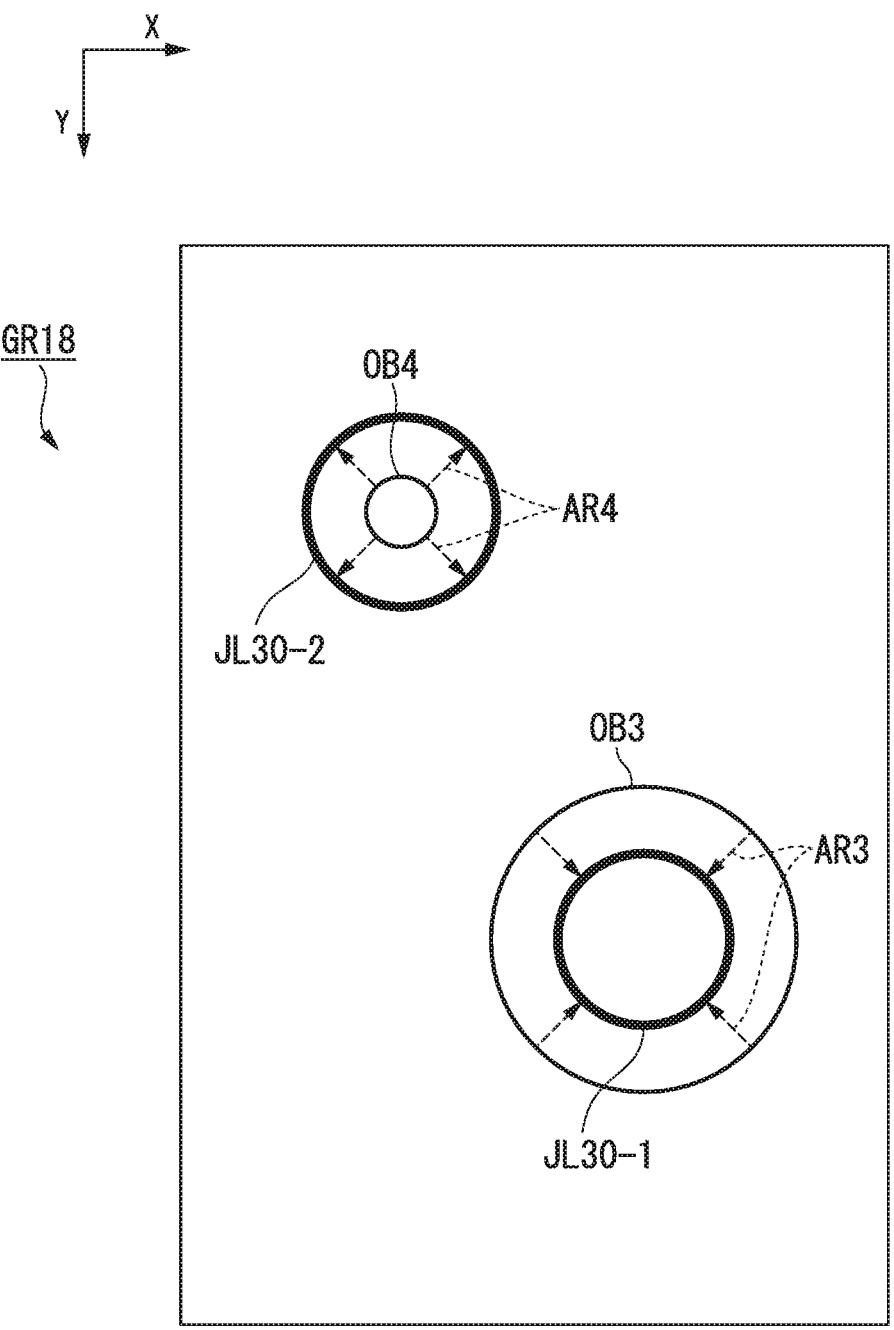
FIG. 16 shows a sixth variation example of the game screen in the play mode.

FIG. 16 shows a sixth variation example of a game screen in the play mode.

The game screen GR18 shown in FIG. 16 shows two judgment circles, JL30-1 and JL30-2 (hereinafter sometimes referred to as judgement circles JL30), and two movement objects, OB3 and OB4. The judgment circles JL30-1 and JL30-2 are examples of reference indicators representing ring-shaped reference positions.

In the game screen GR18, the movement object OB3 is a forward-direction movement object, and the movement object OB4 is a reverse-direction movement object. The forward-direction movement object OB3 appears as an outer circle with a radius larger than the judgment circle JL30-1 and shrinks as shown by the arrow AR3 in accordance with the advance of playback time. When the forward-direction movement object OB3 has overlapped with the judgment circle JL30-1 it represents the instructed timing. In contrast, the reverse-direction movement object OB4 appears as an inner circuit with a radius smaller than the judgment circle JL30-2 and expands as shown by the arrows AR4 in accordance with the advance of the playback time. When the reverse-direction movement object OB4 has overlapped with the judgment circle JL30-2 it represents the instructed timing. In this manner, the game machine 10 may cause the arrival of movement objects from both inside and outside the reference indicator. In accordance with a prescribed condition, or in accordance with the arrival of a prescribed time, the size (radius) of the judgment circle JL30 may be caused to change. In this case, the output controller 156, 156A may perform control so that, for example, the forward-direction movement object OB3 is caused to appear with the size of the judgment circle JL30 before the change and then, when the size of the judgment circle JL30 changes, that is, when the judgment circle JL30 becomes larger, the reverse-direction movement object OB4 is caused to appear. Conversely, the output controller 156, 156A may perform control so that, for example, the reverse-direction movement object OB4 is caused to appear with the size of the judgment circle JL30 before the change and then, when the size of the judgment circle JL30 changes, that is, when the judgment circle JL30 becomes smaller, the forward-direction movement object OB3 is caused to appear.

The above completes the description of variation examples of the game screen.

In the above-described embodiments and variation examples, the sequence data SD10 edited by a certain user may be used by another user. In this case, for example, the sequence data storage 142 of the game machine 10A registers edited sequence data SD10 via a plurality of terminal devices 30A connected to the game machine 10A and references the sequence data SD10 mutually between the plurality of terminal devices 30A.

In the above-described embodiments and variation examples, although the description has been for the registering of display positions and the like of reference indicators such as judgment lines and judgment circles in the edit mode, the target for registration is not limited to this. For example, the game machine 10, 10A may enable editing of the movement object movement path, instructed timing, or type and the like.

In the above-described embodiments and variation examples, the setting of the movement start timing of the judgment line may be made fine-tunable in the edit mode. As an example, the setting of the movement start timing using a lane will now be described.

In the above-described embodiments and variation examples, the distance between each position on the lane and the judgment line corresponds to a time difference. Because the judgment line corresponds to the playback time, each position on the lane corresponds to a timing that is offset from the playback time indicated by the judgment line by an amount of time in accordance with the distance from the judgment line. If this is used the movement start timing can be fine-tuned.

Specifically, for example, the user first selects one of the pattern selection buttons PB1 to PB7 to select a judgment line pattern. Next, the user makes a touch operation to select one of the lanes. The first operation acceptor 152, 152A calculates the timing corresponding to the position at which the touch operation was accepted. For example, the first operation acceptor 152, 152A assumes that a movement object exits at the position at which the touch operation was accepted and acquires the instructed timing of that movement object. This instructed timing is the timing at which the time in accordance to the distance between the judgment line and the touch position has been advanced from the playback time. If a touch operation has been accepted at a position on an extension line from a lane (a position exceeding the judgment line), the first operation acceptor 152, 152A acquires the timing of returning from the playback time an amount of time in accordance with the distance between the judgment line and the touch position. The first operation acceptor 152, 152A then stores the calculated timing in association with the identification information of the selected pattern into memory. By doing this, the user can fine tune the movement start timing and movement end timing of the judgment line, and the game machine 10, 10A can improve the ease of operation in the edit mode.

The fine tuning of the movement start timing may be performed by a method other than that of the above-described use of the lane. For example, with respect to a touch operation to above the center part for the game screen in the Y-axis direction, a portion of time in accordance with the distance between the touch position and the center part is acquired as a timing advanced from the playback time. In the same manner, with respect to a touch operation to below the center part for the game screen in the Y-axis direction, a portion of time in accordance with the distance between the touch position and the center part is acquired as a timing before the playback time. The acquired timing may be set as the movement start timing.

In the above-described embodiments and variation examples, although the description has been of the case in which, by reversing a lane, the display position of the reference indicator and the direction of movement of a movement object change, the change of the reference indicator display position and the movement direction of the movement object are not restrictions. For example, the direction in which a movement object reaches the judgment line may be changed from being both sides of the judgment line to being only one side of the judgment line, and may be changed from one side of the judgment line to the reverse side thereof. Both the movement object before lane reversal and the movement object after lane reversal may be displayed and caused to reach the judgment line simultaneously from both sides. The movement direction of a movement object is not restricted to that described above, and can be arbitrary. For example, the forward direction and the reverse direction may be reversed.

The change condition is not restricted to that described above. For example, in the above-described example, although the description is for the case in which, in the game screen, the lane is reversed if there is space on both sides of the judgment line, the lane may be reversed even if there is no space. By doing this, the difficulty level of the game can be increased, and the interest in the game can be heightened. Also, for example, the evaluation by the evaluator 155 may be changed in accordance with the change in the display position of the reference indicator and the movement direction of the movement object ma in accordance with the play situation, including the change condition. The above-described variation examples may be arbitrarily combined. If the change condition has been satisfied, the probability of lane reversal may be changed in accordance with the change condition that has been satisfied.

Although in the above-described embodiments and variation examples the description has been of the case in which the movement objects mainly appear from the edge of the screen, this is not a restriction. A movement object may appear from an arbitrary position on the screen. For example, a movement object may be made to appear from the center of the region surrounded by the judgment line JL20 shown in FIG. 15 (for example the center of the screen) and may be moved toward each of the judgment lines JL21 to JL24. In that case, for example, the four sides of the screen may be taken to be the judgment lines JL21 to JL24. When the judgment lines JL21 to JL24 are moved toward the center part of the screen, as shown in FIG. 15 and have reached prescribed positions (for example, the center part of the screen) or have become a prescribed shape (for example, a rectangle), movement objects may be moved both from the outside of the screen and from the center of a region surrounded by the judgment line JL20 so as to cause the movement objects to reach the judgment line JL20.

In the above-described embodiments and variation examples, although the description is of the case in which the game screen is displayed in two dimensions, this is not a restriction. For example, the game screen may be rendered as a virtual three-dimensional space that has a depth direction perpendicular to the X and Y axis. In this case, the reference indicator that a movement object reaches may be the region of a curved surface (including planes). The movement object may reach this curved surface from one side, or may reach it from both sides. Both sides of a curved surface mean one and another sides that sandwich the curved surface.

In the above-described embodiments, although the processing method has been described using FIG. 5 to FIG. 8, this is not a restriction. For example, the above-described processing method may be implemented by using interrupt processing or the like.

Each element or device for the game apparatus described above can be implemented by hardware with or without software. In some cases, the game apparatus may be implemented by one or more hardware processors and one or more software components wherein the one or more software components are to be executed by the one or more hardware processors to implement each element or device for the game apparatus. In some other cases, the game apparatus may be implemented by a system of circuits or circuitry configured to perform each operation of each element or device for the game apparatus.

The systems and methods in the above-described embodiments may be deployed in part or in whole through a machine or circuitry that executes computer software, software components, program codes, and/or instructions on one or more processors. The one or more processors may be part of a general-purpose computer, a server, a cloud server, a client, network infrastructure, mobile computing platform, stationary computing platform, or other computing platform. One or more processors may be any kind of computational or processing device or devices which are capable of executing program instructions, codes, binary instructions and the like. The one or more processors may be or include a signal processor, digital processor, embedded processor, microprocessor or any variants such as a co-processor, for example, math co-processor, graphic co-processor, communication co-processor and the like that may directly or indirectly facilitate execution of program codes or program instructions stored thereon. In addition, the one or more processors may enable execution of multiple programs, threads, and codes. The threads may be executed simultaneously to enhance the performance of the one or more processors and to facilitate simultaneous operations of the application. Program codes, program instructions and the like described herein may be implemented in one or more threads. The one or more processors may include memory that stores codes, instructions and programs as described herein. The processor may access a non-transitory processor-readable storage medium through an interface that may store codes, instructions and programs as described herein and elsewhere. The non-transitory processor-readable storage medium associated with the processor for storing programs, codes, program instructions or other type of instructions capable of being executed by the computing or processing device may include but may not be limited to one or more of a memory, hard disk, flash drive, RAM, ROM, CD-ROM, DVD, cache and the like.

A processor may include one or more cores that may enhance speed and performance of a multiprocessor. In some embodiments, the process may be a dual core processor, quad core processors, other chip-level multiprocessor and the like that combine two or more independent cores.

The methods and systems described herein may be deployed in part or in whole through a machine that executes computer software on a server, client, firewall, gateway, hub, router, or other such computer and/or networking hardware.

The software program may be associated with one or more client that may include a file client, print client, domain client, internet client, intranet client and other variants such as secondary client, host client, distributed client and the like. The client may include one or more of memories, processors, computer readable media, storage media, physical and virtual ports, communication devices, and interfaces capable of accessing other clients, servers, machines, and devices through a wired or a wireless medium, and the like. The programs or codes as described herein may be executed by the client. In addition, other devices required for execution of methods as described in this application may be considered as a part of the infrastructure associated with the client. The client may provide an interface to other devices including servers, other clients, printers, database servers, print servers, file servers, communication servers, distributed servers and the like. This coupling and/or connection may facilitate remote execution of program across the network. The networking of some or all of these devices may facilitate parallel processing of a program or method at one or more location. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The software program may be associated with one or more servers that may include a file server, print server, domain server, internet server, intranet server and other variants such as secondary server, host server, distributed server and the like. The server may include one or more of memories, processors, computer readable media, storage media, physical and virtual ports, communication devices, and interfaces capable of accessing other servers, clients, machines, and devices through a wired or a wireless medium, and the like. The methods, programs or codes as described herein may be executed by the server. In addition, other devices required for execution of methods as described in this application may be considered as a part of the infrastructure associated with the server. The server may provide an interface to other devices including clients, other servers, printers, database servers, print servers, file servers, communication servers, distributed servers, social networks, and the like. This coupling and/or connection may facilitate remote execution of program across the network. The networking of some or all of these devices may facilitate parallel processing of a program or method at one or more locations. Any of the devices attached to the server through an interface may include at least one storage medium capable of storing programs, codes and/or instructions. A central repository may provide program instructions to be executed on different devices. In this implementation, the remote repository may act as a storage medium for program codes, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing devices associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory, for example, USB sticks or keys, floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods, devices, apparatus, and systems described herein may transform physical and/or or intangible items from one state to another. The methods and systems described herein may also transform data representing physical and/or intangible items from one state to another.

The modules, engines, components, and elements described herein, including in flow charts and block diagrams throughout the figures, imply logical boundaries between the modules, engines, components, and elements. However, according to software or hardware engineering practices, the modules, engines, components, and elements and the functions thereof may be implemented on one or more processors, computers, machines through computer executable media, which are capable of executing program instructions stored thereon as a monolithic software structure, as standalone software modules, or as modules that employ external routines, codes, services, or any combination of these, and all such implementations may be within the scope of the present disclosure. Examples of such machines may include, but is not limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers, processor-embedded eyewear and the like. Furthermore, the modules, engines, components, and elements in the flow chart and block diagrams or any other logical component may be implemented on one or more machines, computers or processors capable of executing program instructions. Whereas the foregoing descriptions and drawings to which the descriptions have been referred set forth some functional aspects of the disclosed systems, no particular arrangement of software for implementing these functional aspects should be inferred from these descriptions unless explicitly stated or otherwise clear from the context. It will also be appreciated that the various steps identified and described above may be varied, and that the order of steps may be adapted to particular applications of the techniques disclosed herein. All such variations and modifications are intended to fall within the scope of this disclosure. The descriptions of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general purpose computer and/or dedicated computing device or specific computing device or particular aspect or component of a specific computing device. The processes may be realized in one or more microprocessors, microcontrol devices, embedded microcontrol devices, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While certain embodiments of the present inventions have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A game machine comprising:
a first operation acceptor configured to accept a first operation in an editing mode;
a register configured to register a display position of a movable reference indicator over a display screen;
a second operation acceptor configured to accept a second operation in a play mode that is different from the editing mode;
an output controller configured to display the movable reference indicator at the display position, registered by the register, over the display screen, the output controller configured to move a movement object toward the movable reference indicator at the display position over the display screen; and
an evaluator configured to evaluate the second operation based at least in part on a first timing that the movement object reaches the movable reference indicator and a second timing that the second operation is performed,
wherein the register is configured to register at least one of a third timing that the movable reference indicator starts to move toward the display position and a fourth timing that the movable reference indicator completes moving to the display position, and
wherein the output controller is configured to move the movable reference indicator to the display position registered by the register, if the movable reference indicator is displayed at a different position from the display position registered by the register.

2. The game machine according to claim 1,
wherein the register is configured to register the at least one of the third timing and the fourth timing if a time difference between the third timing and the fourth timing is greater than a predefined time period.

3. The game machine according to claim 1,
wherein the output controller is configured to output an alert if a time difference between the third timing and the fourth timing is shorter than a predefined time period.

4. The game machine according to claim 1,
wherein the register is configured to further register a display angle of the movable reference indicator over the display screen, and
wherein the output controller is configured to display the movable reference indicator at the display angle which was registered by the register.

5. The game machine according to claim 1,
wherein the register is configured to further register a shape of the movable reference indicator over the display screen, and
wherein the output controller is configured to display the movable reference indicator with the shape which was registered by the register.

6. The game machine according to claim 1,
wherein the output controller is configured to move the movable reference indicator to reach the movable reference indicator in a predefined direction with reference to the display screen.

7. The game machine according to claim 1,
wherein the register is configured to further register, based on the first operation, at least one of a display position, a display angle and a shape of each of a plurality of the movable reference indicator which are to be displayed simultaneously over the display screen by the output controller.

8. A non-transitory computer readable storage medium that stores a software component which comprises computer-executable instructions, when executed by a computer, to cause the computer to at least:
accept a first operation in an editing mode;
register a display position of a movable reference indicator over a display screen;
accept a second operation in a play mode that is different from the editing mode;
display the movable reference indicator at the display position, registered by the register operation, over the display screen;

move a movement object toward the movable reference indicator at the display position over the display screen; and evaluate the second operation based at least in part on a first timing that the movement object reaches the movable reference indicator and a second timing that the second operation is performed, wherein the register operation comprises: registering at least one of a third timing that the movable reference indicator starts to move toward the display position and a fourth timing that the movable reference indicator completes moving to the display position, and wherein the move operation comprises: moving the movable reference indicator to the display position registered by the register, if the movable reference indicator is displayed at a different position from the display position registered by the register operation.

9. The non-transitory computer readable storage medium according to claim 8, wherein the software component comprises further computer-executable instructions, when executed by a computer, to cause the computer to at least:
register the at least one of the third timing and the fourth timing if a time difference between the third timing and the fourth timing is greater than a predefined time period.

10. The non-transitory computer readable storage medium according to claim 8, wherein the software component comprises further computer-executable instructions, when executed by a computer, to cause the computer to at least:
output an alert if a time difference between the third timing and the fourth timing is shorter than a predefined time period.

11. The non-transitory computer readable storage medium according to claim 8, wherein the software component comprises further computer-executable instructions, when executed by a computer, to cause the computer to at least:
register a display angle of the movable reference indicator over the display screen, and
display the movable reference indicator at the display angle which was registered by the register operation.

12. The non-transitory computer readable storage medium according to claim 8, wherein the software component comprises further computer-executable instructions, when executed by a computer, to cause the computer to at least:
register a shape of the movable reference indicator over the display screen, and
display the movable reference indicator with the shape which was registered by the register.

13. The non-transitory computer readable storage medium according to claim 8, wherein the software component comprises further computer-executable instructions, when executed by a computer, to cause the computer to at least:
move the movable reference indicator to reach the movable reference indicator in a predefined direction with reference to the display screen.

14. The non-transitory computer readable storage medium according to claim 8, wherein the software component comprises further computer-executable instructions, when executed by a computer, to cause the computer to at least:
register, based on the first operation, at least one of a display position, a display angle and a shape of each of a plurality of the movable reference indicator which are to be displayed simultaneously over the display screen by the output controller.

* * * * *